US012804654B2

(12) United States Patent
Choi et al.

(10) Patent No.: US 12,804,654 B2
(45) Date of Patent: Nov. 17, 2026

(54) METHOD AND APPARATUS FOR COMMUNICATION OF ENHANCED REDUCED CAPABILITY USER EQUIPMENT IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Hyunsuk Ryu, Gyeonggi-do (KR); Sungjin Park, Gyeonggi-do (KR); Jaewon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 160 days.

(21) Appl. No.: 18/799,317

(22) Filed: Aug. 9, 2024

(65) Prior Publication Data

US 2025/0056539 A1 Feb. 13, 2025

(30) Foreign Application Priority Data

Aug. 10, 2023 (KR) ........................ 10-2023-0104936

(51) Int. Cl.
*H04W 72/1273* (2023.01)
*H04L 5/16* (2006.01)
(Continued)

(52) U.S. Cl.
CPC ........... *H04W 72/1273* (2013.01); *H04L 5/16* (2013.01); *H04W 72/1268* (2013.01); *H04W 72/231* (2023.01)

(58) Field of Classification Search
CPC ........... H04W 72/1273; H04W 72/231; H04W 72/1268; H04L 5/16
See application file for complete search history.

(56) References Cited

U.S. PATENT DOCUMENTS

2022/0330296 A1 10/2022 Sun et al.
2022/0361220 A1 11/2022 Zewail et al.
(Continued)

FOREIGN PATENT DOCUMENTS

KR 1020240045844 4/2024

OTHER PUBLICATIONS

Nokia, "Introduction of Multi-Cell PDSCH/PUSCH Scheduling", R1-2306342, 3GPP TSG-RAN WG1 Meeting #113, May 22-26, 2023, 58 pages.
(Continued)

*Primary Examiner* — Gbemileke J Onamuti
(74) *Attorney, Agent, or Firm* — The Farrell Law Firm, P.C.

(57) ABSTRACT

The disclosure relates to a fifth generation (5G) or sixth generation (6G) communication system for supporting a higher data transmission rate. The disclosure provides a method performed by a user equipment (UE) in a communication system, comprising identifying a first physical downlink shared channel (PDSCH) scheduled by first downlink control information (DCI) associated with a first control resource set (CORESET); identifying a second PDSCH scheduled by second DCI associated with a second CORESET; identifying a physical uplink shared channel (PUSCH); identifying that the first PDSCH, the second PDSCH and the PUSCH are overlapped in time, wherein a first symbol of the PUSCH is between a first symbol of the first PDSCH and a first symbol of the second PDSCH; and receiving the first PDSCH or the second PDSCH, or transmitting the PUSCH.

20 Claims, 13 Drawing Sheets

(51) Int. Cl.
*H04W 72/1268* (2023.01)
*H04W 72/231* (2023.01)

(56) References Cited

U.S. PATENT DOCUMENTS

| | | | |
|---|---|---|---|
| 2023/0084429 | A1 | 3/2023 | Zhang et al. |
| 2023/0132040 | A1 | 4/2023 | Gao et al. |
| 2024/0114508 | A1 | 4/2024 | Choi et al. |

OTHER PUBLICATIONS

International Search Report dated Nov. 19, 2024 isssued in counterpart application No. PCT/KR2024/011871, 6 pages.
3GPP TS 38.214 V18.0.0 (Sep. 2023), 278 pp.

METHOD AND APPARATUS FOR COMMUNICATION OF ENHANCED REDUCED CAPABILITY USER EQUIPMENT IN WIRELESS COMMUNICATION SYSTEM

CROSS-REFERENCE TO RELATED APPLICATION(S)

The present application is based on and claims priority under 35 U.S.C. § 119 to Korean Patent Application No. 10-2023-0104936, filed on Aug. 10, 2023, in the Korean Intellectual Property Office, the disclosure of which is incorporated by reference herein in its entirety.

BACKGROUND

1. Field

The disclosure relates to a communication method and apparatus for an enhanced reduced capability (RedCap) user equipment (UE) in a wireless communication system. More specifically, the disclosure relates to a method and apparatus for transmitting and receiving uplink and downlink data of an enhanced RedCap UE in a wireless communication system.

2. Description of Related Art

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, implementing 6G mobile communication technologies (referred to as "beyond 5G systems") in terahertz (THz) bands (for example, 95 GHz to 3 THz bands) has been considered in order to accomplish transmission rates fifty times faster than 5G mobile communication technologies and ultra-low latencies one-tenth of 5G mobile communication technologies.

Since the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as vehicle-to-everything (V2X) systems for aiding driving determination by autonomous vehicles based on information regarding positions and states of vehicles transmitted by the vehicles and for enhancing user convenience, new radio unlicensed (NR-U) systems aimed at system operations conforming to various regulation-related requirements in unlicensed bands, NR UE power saving systems, non-terrestrial network (NTN) systems, which are UE-satellite direct communication systems for providing coverage in an area in which communication with terrestrial networks is unavailable, and positioning systems.

Moreover, there is also ongoing standardization in air interface for architecture/protocol(s) of technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access (2-step RACH) for simplifying random access procedures in new radio (NR). There is also ongoing standardization in system architecture/service(s) for a 5G baseline architecture (e.g., a service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in THz bands of 6G mobile communication technologies, multi-antenna transmission technologies such as full dimensional MIMO (FD-MIMO), array antennas and large-scale antennas, metamaterial-based lenses and antennas for improving coverage of THz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

In addition, to support technologies such as sensors, surveillance cameras, and smart watches, the NR RedCap UE standard that enables data transmission and reception by accessing the 5G communication system while reducing the capability of the UE in 3rd Generation Partnership Project (3GPP) is being considered.

SUMMARY

The disclosure proposes a method for transmitting and receiving uplink and downlink data for an enhanced RedCap UE, which is a UE with further RedCap than a typical RedCap UE in an NR system.

According to an embodiment of the disclosure, an enhanced RedCap UE can efficiently transmit and receive uplink and downlink data in an NR system.

According to an embodiment of the disclosure, a method performed by a UE in a communication system is provided. The method includes identifying a first physical downlink shared channel (PDSCH) scheduled by first downlink control information (DCI) associated with a first control resource set (CORESET), identifying a second PDSCH scheduled by second DCI associated with a second CORESET, identifying a physical uplink shared channel (PUSCH), identifying that the first PDSCH, the second PDSCH and the PUSCH are overlapped in time, wherein a first symbol of the PUSCH is between a first symbol of the first PDSCH and a first symbol of the second PDSCH, and receiving the first PDSCH or the second PDSCH, or transmitting the PUSCH.

According to another embodiment of the disclosure, a method performed by a base station in a communication system is provided. The method includes identifying a first PDSCH scheduled by first DCI associated with a first CORESET, identifying a second PDSCH scheduled by second DCI associated with a second CORESET, identifying a PUSCH, identifying that the first PDSCH, the second PDSCH and the PUSCH are overlapped in time, wherein a first symbol of the PUSCH is between a first symbol of the first PDSCH and a first symbol of the second PDSCH, and transmitting the first PDSCH or the second PDSCH, or receiving the PUSCH.

According to another embodiment of the disclosure, a UE in a communication system is provided. The UE includes a transceiver and at least one processor configured to identify a first PDSCH scheduled by first DCI associated with a first CORESET, identify a second PDSCH scheduled by second DCI associated with a second CORESET, identify a PUSCH, identify that the first PDSCH, the second PDSCH and the PUSCH are overlapped in time, wherein a first symbol of the PUSCH is between a first symbol of the first PDSCH and a first symbol of the second PDSCH, and receive the first PDSCH or the second PDSCH, or transmit the PUSCH.

According to another embodiment of the disclosure, a base station in a communication system is provided. The base station includes a transceiver and at least one processor configured to identify a first PDSCH scheduled by first DCI associated with a first CORESET, identify a second PDSCH scheduled by second DCI associated with a second CORESET, identify a PUSCH, identify that the first PDSCH, the second PDSCH and the PUSCH are overlapped in time, wherein a first symbol of the PUSCH is between a first symbol of the first PDSCH and a first symbol of the second PDSCH, and transmit the first PDSCH or the second PDSCH, or receive the PUSCH.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
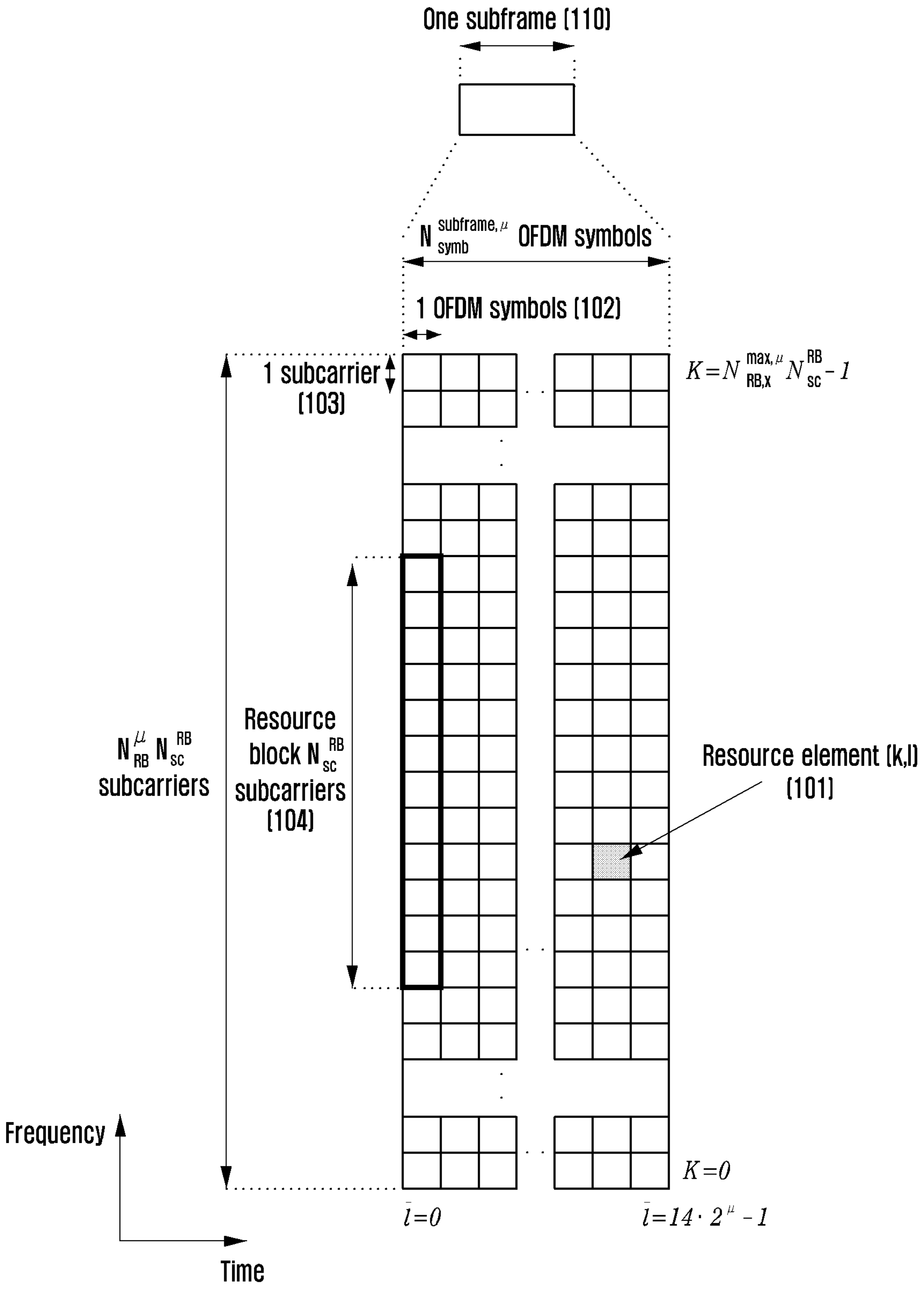
FIG. 1 is a diagram illustrating a basic structure of a time-frequency domain, which is a radio resource domain in a wireless communication system, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

In the description of embodiments, descriptions of techniques that are well known in the art and not directly related to the disclosure are omitted. This is to clearly convey the gist of the disclosure by omitting any unnecessary explanation.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the operators, or customs. Therefore, the definitions of the terms should be made based on the contents throughout the specification.

Hereinafter, a base station is an entity that allocates resources to terminals, and may be at least one of a gNode B, an eNode B, a Node B, a base station, an access point (AP), a wireless access unit, a base station controller, and a node on a network. A terminal may be at least one of a UE, a mobile station (MS), a terminal, a cellular phone, a smartphone, a smartwatch, a wearable device, a computer, an electronic device, and various multimedia systems capable of performing communication functions. In the disclosure, a downlink (which may also be referred to as "DL") refers to a radio link path via which a base station transmits a signal to a terminal, and an uplink (which may also be referred to as "UL") refers to a radio link path via which a terminal transmits a signal to a base station. Further, in the following description, long-term evolution (LTE) or LTE-advanced (LTE-A) systems may be described by way of example, but the embodiments of the disclosure may also be applied to other communication systems having similar technical backgrounds or channel types. Examples of such communication systems may include 5G and NR developed beyond LTE-A, and in the following description, 5G may be a concept that covers existing technologies such as LTE, LTE-A, or other similar services. In addition, based on determinations by those skilled in the art, the embodiments of the disclosure may also be applied to other communication systems through some modifications without significantly departing from the scope of the disclosure.

Herein, each block of the flowchart illustrations, and combinations of blocks in the flowchart illustrations, may be performed by computer program instructions. These computer program instructions may be loaded onto a processor of a general purpose computer, special purpose computer, or other programmable data processing apparatus to produce a machine, such that the instructions, which are executed via the processor of the computer or other programmable data processing apparatus, create means for performing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that perform the function specified in the flowchart block(s). The computer program instructions may also be loaded onto a computer or other programmable data processing apparatus to cause a series of operational steps to be performed on the computer or other programmable data processing apparatus to produce a computer executed process such that the instructions that are executed on the computer or other programmable data processing apparatus provide steps for executing the functions specified in the flowchart block(s).

Further, each block may represent a module, segment, or portion of code, which includes one or more executable instructions for executing the specified logical function(s). It should also be noted that in some alternative implementations, the functions noted in the blocks may occur out of the order. For example, two blocks shown in succession may in fact be performed substantially concurrently or the blocks may sometimes be performed in the reverse order, depending upon the functionality involved.

As used in embodiments of the disclosure, the term "unit" refers to a software element or a hardware element, such as a field programmable gate array (FPGA) or an application specific integrated circuit (ASIC), which performs a predetermined function. However, the term "unit" does not always have a meaning limited to software or hardware. The term "unit" may be constructed either to be stored in an addressable storage medium or to execute one or more processors. The term "unit" includes, for example, components such as software components, object-oriented software components, class components, and task components, processes, functions, properties, procedures, sub-routines, segments of a program code, drivers, firmware, micro-codes, circuits, data, database, data structures, tables, arrays, and parameters. The components and functions provided by the term "unit" may be either combined into a smaller number of components, or divided into additional components. Moreover, the components and "units" may be implemented to reproduce one or more computer processing units (CPUs) within a device or a security multimedia card. Further, in the embodiments, the term "unit" may include one or more processors.

The method and apparatus proposed in the embodiments of the disclosure will be described by using an Internet of things (IoT) service (an industrial wireless sensor network (IWSN), surveillance camera, wearable, etc.) as an example. The apparatus and method may also be applied to downlink reception and uplink transmission methods corresponding to other additional services by using all or a combination of one or more embodiments proposed in the disclosure. Accordingly, the embodiments of the disclosure are applicable through partial modifications within a range without significantly departing from the scope of the disclosure, by judgement by those skilled in technical knowledge (i.e., those skilled in the art).

Further, in describing the disclosure, a detailed description of known functions or configurations incorporated herein may be omitted in the case that it is determined that the description may make the subject matter of the disclosure unnecessarily unclear. The terms which will be described below are terms defined in consideration of the functions in the disclosure, and may be different according to users, intentions of the operators, or customs. Therefore, the definitions of the terms should be made based on the contents throughout the specification.

Beyond the early voice-oriented services, a wireless communication system has been developed as a broadband wireless communication system that provides a highspeed and high-quality packet data service, such as 3GPP high speed packet access (HSPA), LTE or evolved universal terrestrial radio access (E-UTRA), LTE-A, LTE-Pro, 3GPP 2 (3GPP2) high rate packet data (HRPD), ultra-mobile broadband (UMB), and communication standards including Institute of Electrical and Electronics Engineers (IEEE's) 802.16e and the like.

As a representative example of the broadband wireless communication system, the LTE system has adopted an orthogonal frequency division multiplexing (OFDM) scheme in a downlink and has adopted a single carrier frequency division multiple access (SC-FDMA) scheme in an uplink. The uplink refers to a radio link through which a UE transmits data or a control signal to a base station and the downlink refers to a radio link through which a base station transmits data or a control signal to a UE. The multiple access scheme as described above generally allocates and operates time-frequency resources including data or control information to be transmitted to each user to prevent the time-frequency resources from overlapping with each other, that is, establish orthogonality, thereby dividing the data or the control information of each user.

A 5G communication system, which is a beyond LTE communication system, is required to freely reflect various requirements of users and service providers so that the services satisfying the various requirements should be supported at the same time. Services considered for the 5G communication system include eMBB, mMTC, URLLC, etc.

The eMBB is aimed at providing more enhanced data rates than the existing LTE, LTE-A, or LTE-Pro-supported data transmission rates. For example, in the 5G communication system, the eMBB is required to provide 20 gigabits per second (Gbps) peak data rate in a downlink and 10 Gbps peak data rate in an uplink in terms of a single base station. Furthermore, the 5G communication system may need to provide an increasing user perceived data rate while providing the peak data rate. To satisfy these requirements, enhancement of various technologies for transmission or reception including MIMO transmission technologies may be required in the 5G communication system. While the LTE system may use up to 20 megahertz (MHz) transmission bandwidth in the 2 GHz band for signal transmission, the 5G communication system may use a frequency bandwidth wider than 20 MHz in the 3 to 6 GHz band or in the 6 GHz or higher frequency band, thereby satisfying the data rate required by the 5G communication system.

The mMTC may support application services, such as IoT technologies, in the 5G communication system. To efficiently provide the IoT technologies, the mMTC should satisfy requirements, such as massive terminal connection support in a cell, terminal coverage improvement, improved battery time, and terminal cost reduction. Since IoT technologies may be attached to various sensors and various devices to provide communication functions, the mMTC should support a large number of terminals (e.g., 1,000,000 terminals/kilometer $(km)^2$) in the cell. Further, since the UE supporting the mMTC may be located in a shaded area that the cell cannot cover, such as a basement of a building, due to the service characteristics, the UE may require a wider coverage compared to other services provided by the 5G communication system. The UE supporting the mMTC should be generally inexpensive, and may have a very long battery lifetime, such as 10 to 15 years, since it is difficult to frequently replace a battery of the UE.

Ultra-reliable low latency communication (URLLC) is a cellular-based wireless communication service used for a specific purpose (mission-critical). For example, services may be used for remote control of a robot or machinery, industrial automation, an unmanned aerial vehicle, remote health care, and an emergency alert. Accordingly, the communication provided by the URLLC should provide very low latency and very high reliability. For example, a service supporting the URLLC should satisfy air interface latency that is shorter than 0.5 ms and requires a packet error rate of $10^{-5}$ or less at the same time. Accordingly, for the service supporting the URLLC, the 5G system should provide a transmit time interval (TTI) that is smaller than those of other services, and also allocate a wide array of resources in the frequency band in order to secure reliability of a communication link.

Three services of the 5G communication system (also referred to as the "5G system"), i.e., eMBB, URLLC, and mMTC, may be multiplexed and transmitted as one system. Different transmission/reception techniques and transmission/reception parameters may be used between services to satisfy different requirements of the respective services.

Hereinafter, a wireless communication system to which the disclosure is applied will be described by taking the configuration of a 5G system as an example for convenience of description, but embodiments of the disclosure may be applied in the same or similar manner even in 5G or higher systems or other communication systems to which the disclosure is applicable.

FIG. 1 is a diagram illustrating a basic structure of a time-frequency domain, which is a radio resource domain in a wireless communication system, according to an embodiment.

Referring to FIG. 1, the horizontal axis represents a time domain, and the vertical axis represents a frequency domain. A basic unit of a resource in the time and frequency domain, which is a resource element (RE) 101, may be defined as one OFDM symbol (or discrete Fourier transform (DFT) spread OFDM (DFT-s-OFDM) symbol) 102 in the time axis and one subcarrier 103 in the frequency axis.

$$N_{sc}^{RB}$$

consecutive REs (for example, 12) indicating the number of subcarriers per resource block (RB) in the frequency domain may constitute one RB 104. In addition, $$N_{symb}^{subframe}$$

consecutive OFDM symbols indicating the number of symbols per subframe in the time domain may constitute one subframe 110. For a more detailed description of the resource structure in the 5G system, reference may be made to the technical specification (TS) 38.211 section 4.

Figure 2:
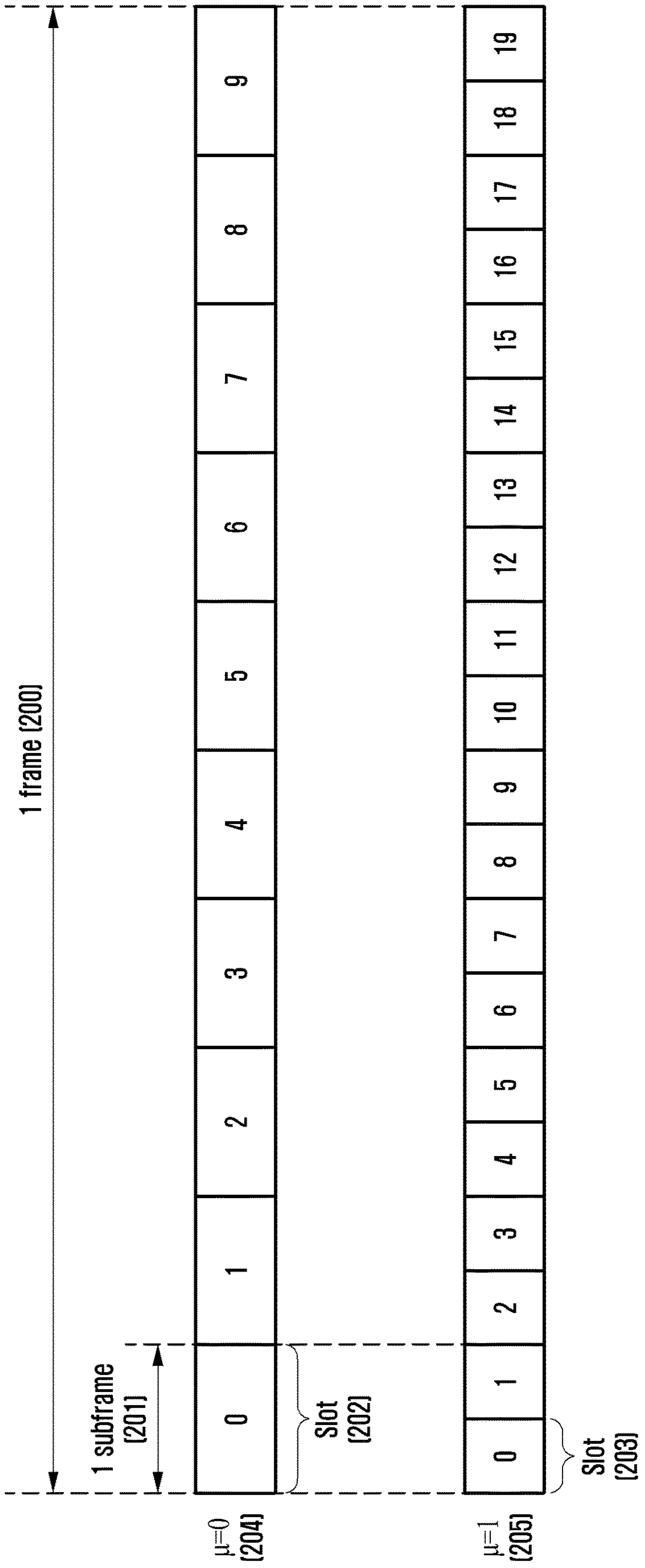
FIG. 2 is a diagram illustrating a slot structure considered in a wireless communication system, according to an embodiment.

FIG. 2 is a diagram illustrating a slot structure considered in a wireless communication system, according to an embodiment.

Referring to FIG. 2, an example of a structure including a frame 200, a subframe 201, and a slot 202 is illustrated. One frame 200 may be defined as 10 ms. One subframe 201 may be defined as 1 ms, and thus, one frame 200 may include a total of 10 subframes 201. In addition, one slot 202 and 203 may be defined as 14 OFDM symbols (i.e., the number of symbols $$(N_{symb}^{slot})$$

per one slot=14). One subframe 201 may include one or multiple slots 202 and 203, and the number of slots 202 and 203 per one subframe 201 may vary according to a configured value, μ 204 and 205 for a subcarrier spacing.

As an example, FIG. 2 illustrates a slot structure in a case of μ=0 204 and μ=1 205 for the subcarrier spacing configuring value. In case that μ=0 204, one subframe 201 may include one slot 202, and in case that μ=1 205, one subframe 201 may include two slots 203. That is, the number of slots $$(N_{slot}^{subframe,\mu})$$

per one subframe may vary according to the configured value μ for a subcarrier spacing, and accordingly, the number of slots $$(N_{slot}^{frame,\mu})$$

per one frame may vary. The $$N_{slot}^{subframe,\mu}$$

and $$(N_{slot}^{frame,\mu})$$

according to each subcarrier spacing configuring μ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G wireless communication system, a synchronization signal block (also referred to as "SSB", "SS block", or "SS/PBCH block") may be transmitted for initial access of a UE, and the synchronization signal block may include a primary synchronization signal (PSS), a secondary synchronization signal (SSS), and a physical broadcast channel (PBCH). In the initial access phase in which the UE accesses the system, the UE first acquires downlink time and frequency domain synchronization from a synchronization signal through cell search and acquires a cell ID. The synchronization signal includes PSS and SSS. In addition, the UE receives the PBCH for transmitting a master information block (MIB) from the base station, and acquires system information related to transmission and reception, such as system bandwidth or relevant control information, and a basic parameter value. Based on this information, the UE may perform decoding on a physical downlink control channel (PDCCH) and a PDSCH to acquire a system information block (SIB). Thereafter, the UE exchanges UE related identification information with the base station through a random access procedure, and initially accesses the network through procedures such as registration and authentication.

Hereinafter, the cell initial access procedure of the 5G wireless communication system will be described in more detail with reference to the drawings.

The synchronization signal, which is a reference signal of the cell search, is transmitted by applying a subcarrier spacing suitable for a channel environment such as phase noise for each frequency band. The 5G base station may transmit a plurality of synchronization signal blocks according to the number of analog beams to be operated. For example, PSS and SSS may be mapped over 12 RBs and then transmitted, and PBCH may be mapped over 24 RBs and then transmitted. Hereinafter, a structure in which a synchronization signal and PBCH are transmitted in a 5G communication system will be described.

Figure 3:
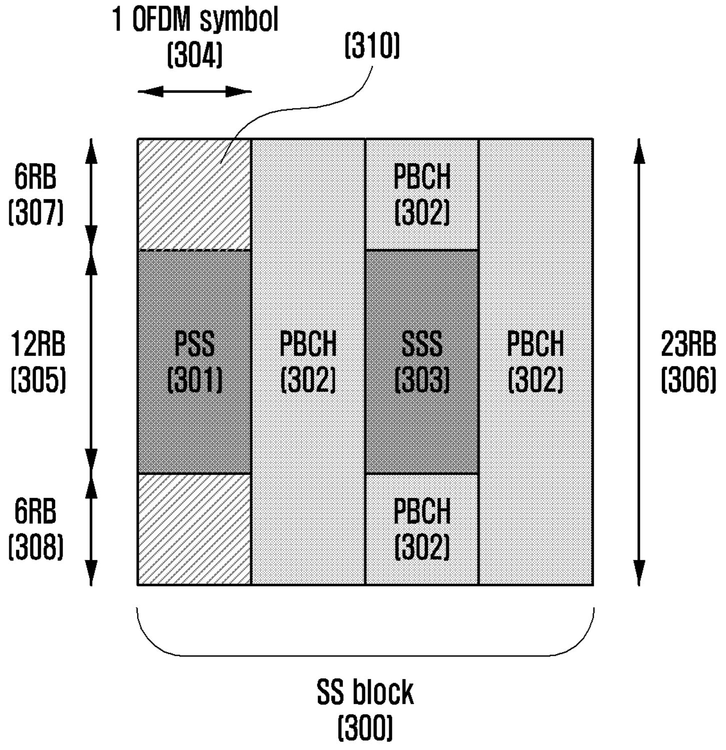
FIG. 3 is a diagram illustrating a synchronization signal block considered in a wireless communication system, according to an embodiment.

FIG. 3 is a diagram illustrating a synchronization signal block considered in a wireless communication system, according to an embodiment.

Referring to FIG. 3, a synchronization signal block (SS block) 300 includes a PSS 301, an SSS 303, and a PBCH 302.

As illustrated in FIG. 3, the SS block 300 is mapped to four OFDM symbols 304 in the time axis. The PSS 301 and SSS 303 may be transmitted through 12 RBs 305 in the frequency axis and through the 1st and 3rd OFDM symbols in the time axis, respectively. In the 5G system, for example, a total of 1008 different cell IDs may be defined, and the PSS 301 may have three different values and the SSS 303 may have 336 different values according to the physical layer ID of a cell. The UE may acquire one of (336×3=)1008 cell IDs, based on a combination of the PSS 301 and SSS 303 through detection thereof. This may be expressed as Equation 1 below.

$$N_{ID}^{cell} = 3N_{ID}^{(1)} + N_{ID}^{(2)} \quad \text{Equation 1}$$

Here, $N^{(1)}{}_{ID}$ may be estimated from the SSS 303 and may have a value between 0 and 335. $N^{(2)}{}_{ID}$ may be estimated from PSS 301 and may have a value between 0 and 2. The $N^{cell}{}_{ID}$ value, a cell ID, may be estimated by the UE from a combination of $N^{(1)}{}_{ID}$ and $N^{(2)}{}_{ID}$.

The PBCH 302 may be transmitted through resources including 24 RBs 306 in the frequency axis and 6 RBs 307 and 308 at both sides except for the central 12 RBs in which the SSS 303 is transmitted in the 2nd to 4th OFDM symbols of the SS block in the time axis. Various system information called MIB may be transmitted in the PBCH 302, and more specifically, the MIB may include information as shown in Table 2 below, and a PBCH payload and PBCH demodulation reference signal (DMRS) include the following additional information. For a more detailed description of the MIB in the 5G system, reference may be made to the TS 38.331.

TABLE 2

```
MIB ::=                      SEQUENCE {
  systemFrameNumber              BIT STRING (SIZE (6),
  subCarrierSpacingCommon          ENUMERATED {scs15or60,
                                   scs30or120},
  ssb-SubcarrierOffset           INTEGER (0..15),
  dmrs-TypeA-Position              ENUMERATED {pos2, pos3},
  pdcch-ConfigSIB1               PDCCH-ConfigSIB1,
```

TABLE 2-continued

| | |
|---|---|
| cellBarred | ENUMERATED {barred, notBarred}, |
| intraFreqReselection | ENUMERATED {allowed, notAllowed}, |
| spare | BIT STRING (SIZE (1)) |
| } | |

Synchronization signal block information may be the offset in the frequency domain of the synchronization signal block and is indicated through 4 bits (ssb-SubcarrierOffset) in the MIB. The index of the synchronization signal block including the PBCH may be indirectly acquired through decoding of the PBCH DMRS and PBCH. More specifically, in the frequency band of 6 GHz or less, 3 bits acquired through decoding of the PBCH DMRS may indicate the synchronization signal block index, and in the frequency band of 6 GHz or higher, a total of 6 bits including 3 bits acquired through decoding of the PBCH DMRS and 3 bits included in PBCH payload and acquired through PBCH decoding may indicate the synchronization signal block index including PBCH.

PDCCH information may be a subcarrier spacing of a common downlink control channel indicated through 1 bit (subCarrierSpacingCommon) in the MIB, and time-frequency resource configuration information of CORESET of identity (ID) 0 and a search space is indicated through 8 bits (pdcch-ConfigSIB1). The CORESET of the above ID 0 may be referred to as controlResourceSetZero, and the search space of the ID 0 may be referred to as searchspace Zero. In the disclosure, the CORESET of ID 0 is called CORESET #0 or control resource set #0 for convenience, and the search space of ID 0 is called SS #0 for convenience. During initial access to a cell, the UE may be configured with frequency resources indicating the number of RBs of CORESET #0 including the common search space set of Type0-PDCCH CSS set and time resources indicating the number of OFDM symbols by the pdcch-ConfigSIB1.

A system frame number (SFN) may be 6 bits (systemFrameNumber) in the MIB, which are used to indicate a part of the SFN. The least significant bit (LSB) 4 bits of the SFN are included in the PBCH payload to be indirectly acquired by a UE through PBCH decoding.

Timing information in a radio frame for the UE may indirectly identify whether the synchronization signal block is transmitted in the 1st or 2nd half frame of the radio frame through 1 bit (a half frame) included in the above-described synchronization signal block index and PBCH payload and acquired through PBCH decoding.

12 RBs 305 corresponding to a transmission bandwidth of the PSS 301 and SSS 303, and 24 RBs 306 corresponding to a transmission bandwidth of the PBCH 302 are different from each other such that in a 1st OFDM symbol in which the PSS 301 is transmitted within the transmission bandwidth of the PBCH 302, 6 RBs 307 and 6 RBs 308 exist at both sides except for the central 12 RBs in which the PSS 301 is transmitted, and the above domain may be used for transmission of another signal or may be empty.

All synchronization signal blocks may be transmitted using the same analog beam. That is, the PSS 301, SSS 303, and PBCH 302 may all be transmitted through the same beam. The analog beam is not applied differently in the frequency axis, such that the same analog beam is applied in any frequency axis RB in a particular OFDM symbol to which a particular analog beam is applied. That is, four OFDM symbols in which the PSS 301, SSS 303, and PBCH 302 are transmitted may be transmitted through the same analog beam.

Figure 4:
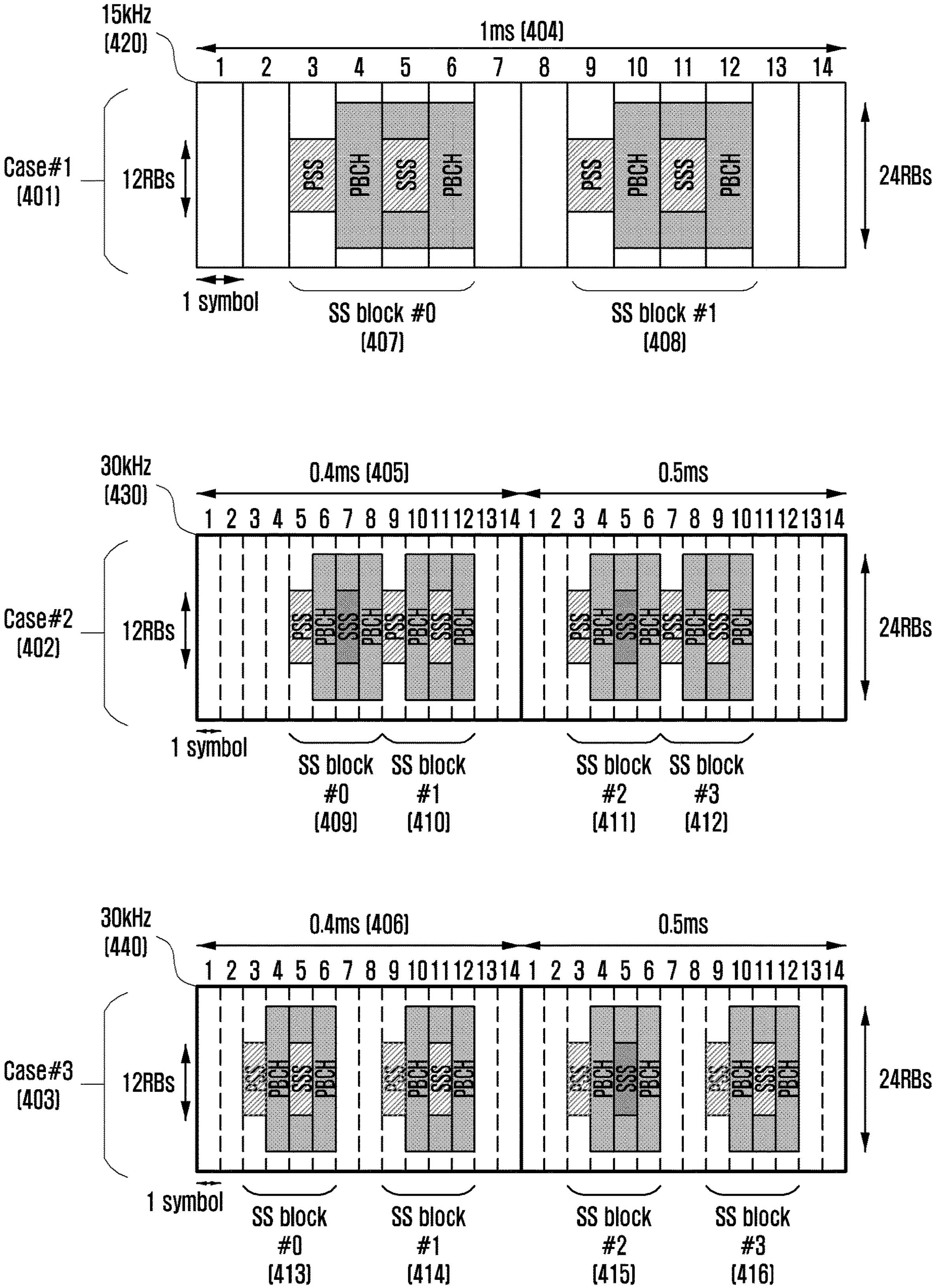
FIG. 4 is a diagram illustrating cases in which a synchronization signal block is transmitted in a frequency band of 6 GHz or less in a wireless communication system, according to an embodiment.

FIG. 4 is a diagram illustrating cases in which a synchronization signal block is transmitted in a frequency band of 6 GHz or less in a wireless communication system, according to an embodiment.

Referring to FIG. 4, in the 5G communication system, a 15 kHz subcarrier spacing (SCS) 420 and 30 KHz SCSs 430 and 440 may be used for synchronization signal block transmission in the frequency band of 6 GHz or less. In case of the 15 kHz subcarrier spacing, one transmission case (case #1 401) of the synchronization signal block may exist, and in case of the 30 kHz subcarrier spacings, two transmission cases (case #2 402 and case #3 403) for the synchronization signal block may exist.

In FIG. 4, in case #1 401 of the 15 kHz subcarrier spacing 420, a maximum of two synchronization signal blocks may be transmitted within 1 ms 404 (or corresponding to a length of one slot in case that one slot includes 14 OFDM symbols). The example of FIG. 4 shows a synchronization signal block #0 407 and a synchronization signal block #1 408. For example, the synchronization signal block #0 407 may be mapped to four consecutive symbols starting from a 3rd OFDM symbol, and the synchronization signal block #1 408 may be mapped to four consecutive symbols starting from a 9th OFDM symbol.

Different analog beams may be applied to the synchronization signal block #0 407 and the synchronization signal block #1 408. In addition, the same beam may be applied to 3rd to 6th OFDM symbols to which synchronization signal block #0 407 is mapped, and the same beam may be applied to 9th to 12th OFDM symbols to which synchronization signal block #1 408 is mapped. The analog beam to be used for the 7th, 8th, 13th, and 14th OFDM symbols to which no synchronization signal block is mapped may be freely determined under the determination of a base station.

In FIG. 4, in case #2 402 of the 30 kHz subcarrier spacing 430, a maximum of two synchronization signal blocks may be transmitted within 0.5 ms 405 (or corresponding to a length of one slot in case that the one slot includes 14 OFDM symbols), and accordingly, a maximum of four synchronization signal blocks may be transmitted within 1 ms (or corresponding a length of two slots in case that one slot includes 14 OFDM symbols). As an example, FIG. 4 shows a case in which the synchronization signal block #0 409, synchronization signal block #1 410, synchronization signal block #2 411, and synchronization signal block #3 412 are transmitted within 1 ms (i.e., two slots). Here, the synchronization signal block #0 409 and synchronization signal block #1 410 may be mapped from a 5th OFDM symbol and 9th OFDM symbol of a 1st slot, respectively, and the synchronization signal block #2 411 and synchronization signal block #3 412 may be mapped from a 3rd OFDM symbol and a 7th OFDM symbol of a 2nd slot, respectively.

Different analog beams may be applied to the synchronization signal block #0 409, synchronization signal block #1 410, block #2 411, and synchronization signal synchronization signal block #3 412. The same analog beam may be applied to the 5th to the 8th OFDM symbols of the 1st slot through which synchronization signal block #0 409 is transmitted, the 9th to the 12th OFDM symbols of the 1st slot through which the synchronization signal block #1 410 is transmitted, the 3rd to the 6th symbols of the 2nd slot through which the synchronization signal block #2 411 is transmitted, and the 7th to the 10th symbols of the 2nd slot through which synchronization signal block #3 412 is transmitted. The analog beam to be used for the OFDM symbols to which no synchronization signal block is mapped may be freely determined under the determination of a base station.

In FIG. 4, in case #3 403 of the 30 kHz subcarrier spacing 440, a maximum of two synchronization signal blocks may be transmitted within 0.5 ms 406 (or corresponding to a length of one slot in case that one slot includes 14 OFDM symbols), and accordingly, a maximum of four synchronization signal blocks may be transmitted within 1 ms (or corresponding to a length of two slots in case that one slot includes 14 OFDM symbols). As an example, FIG. 4 shows a case in which the synchronization signal block #0 413, synchronization signal block #1 414, synchronization signal block #2 415, and synchronization signal block #3 416 are transmitted within 1 ms (i.e., two slots). Here, the synchronization signal block #0 413 and synchronization signal block #1 414 may be mapped from the 3rd OFDM symbol and 9th OFDM symbol of the 1st slot, respectively, and the synchronization signal block #2 415 and synchronization signal block #3 416 may be mapped from the 3rd OFDM symbol and 9th OFDM symbol of the 2nd slot, respectively.

Different analog beams may be used for the synchronization signal block #0 413, synchronization signal block #1 414, synchronization signal block #2 415, and synchronization signal block #3 416, respectively. As described in the above examples, the same analog beam may be used in all four OFDM symbols through which the respective synchronization signal blocks are transmitted, and the analog beam to be used for the OFDM symbols to which no synchronization signal block is mapped may be freely determined under the determination of a base station.

Figure 5:
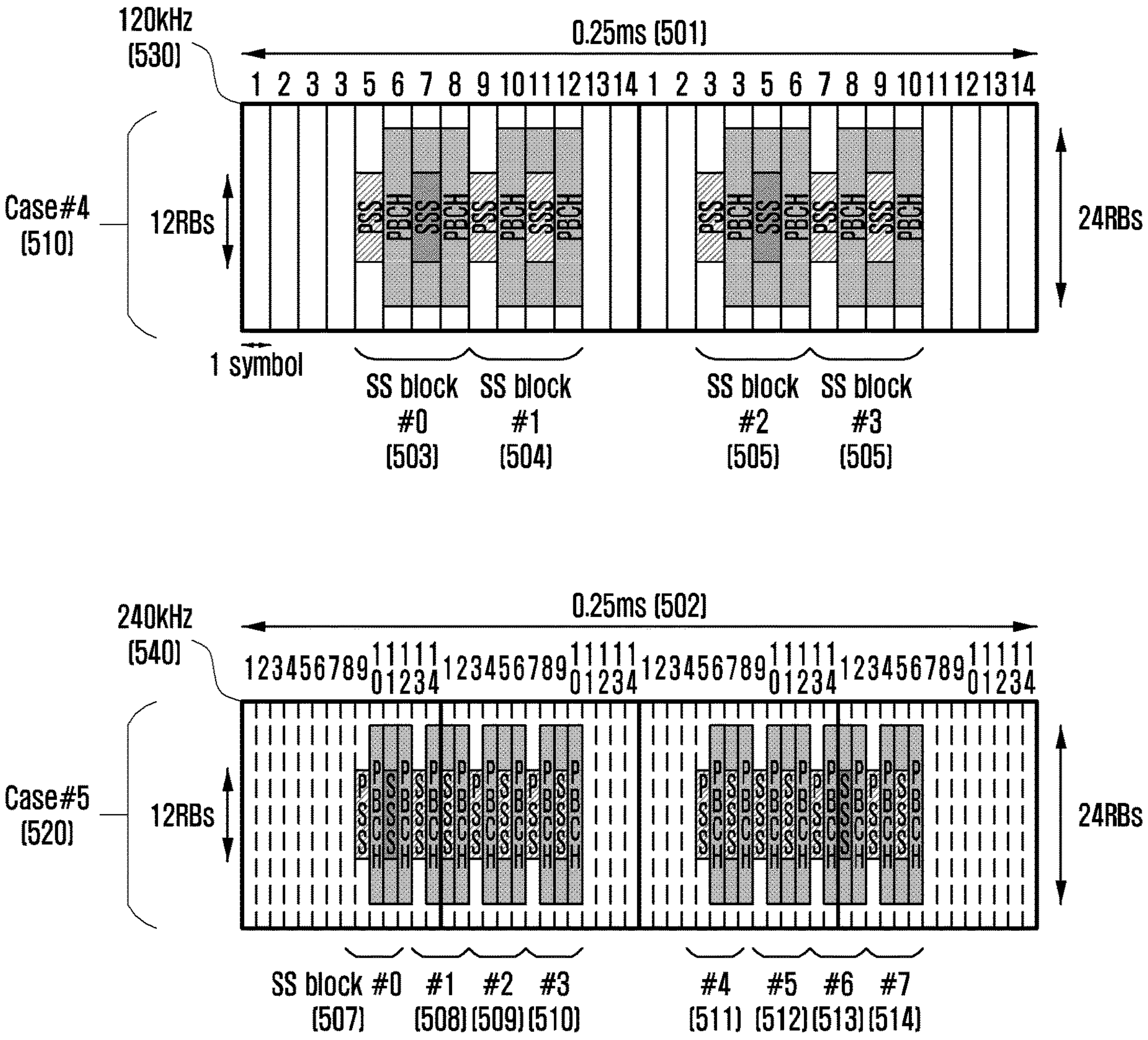
FIG. 5 is a diagram illustrating cases in which a synchronization signal block is transmitted in a frequency band of 6 GHz or higher in a wireless communication system, according to an embodiment.

FIG. 5 is a diagram illustrating cases in which a synchronization signal block is transmitted in a frequency band of 6 GHz or higher in a wireless communication system, according to an embodiment.

Referring to FIG. 5, in the frequency band of 6 GHz or higher in the 5G communication system, 120 kHz subcarrier spacing 530 as in the example of case #4 510 may be used for synchronization signal block transmission and 240 kHz subcarrier spacing 540 as in the example of case #5 520 may be used for synchronization signal block transmission.

In case #4 510 of 120 kHz subcarrier spacing 530, a maximum of four synchronization signal blocks may be transmitted within 0.25 ms 501 (or corresponding to a length of two slots in case that one slot includes 14 OFDM symbols). An example in FIG. 5 shows a case in which the synchronization signal block #0 503, synchronization signal block #1 504, synchronization signal block #2 505, and synchronization signal block #3 506 are transmitted within 0.25 ms (i.e., two slots). Here, the synchronization signal block #0 503 may be mapped to four consecutive symbols starting from the 5th OFDM symbol of the 1st slot and the synchronization signal block #1 504 may be mapped to four consecutive symbols starting from the 9th OFDM symbol of the 1st slot. In addition, the synchronization signal block #2 505 may be mapped to four consecutive symbols starting from the 3rd OFDM symbol of the 2nd slot, and the synchronization signal block #3 506 may be mapped to four consecutive symbols starting from the 7th OFDM symbol of the 2nd slot.

As described in the above embodiment, different analog beams may be used in the synchronization signal block #0 503, synchronization signal block #1 504, synchronization signal block #2 505, and synchronization signal block #3 506. In addition, the same analog beam may be used in all four OFDM symbols through which the respective synchronization signal blocks are transmitted, and the analog beam to be used in the OFDM symbols to which no synchronization signal block is mapped may be freely determined under the determination of a base station.

In case #5 520 of 240 kHz subcarrier spacing 540, a maximum of eight synchronization signal blocks may be transmitted within 0.25 ms 502 (or corresponding to a length of four slots in case that one slot includes 14 OFDM symbols). The example of FIG. 5 shows a case in which the synchronization signal block #0 507, synchronization signal block #1 508, synchronization signal block #2 509, synchronization signal block #3 510, synchronization signal block #4 511, synchronization signal block #5 512, synchronization signal block #6 513, and synchronization signal block #7 514 are transmitted within 0.25 ms (i.e., four slots). Here, the synchronization signal block #0 507 may be mapped to four consecutive symbols starting from the 9th OFDM symbol of the 1st slot, the synchronization signal block #1 508 may be mapped to four consecutive symbols starting from the 13th OFDM symbol of the 1st slot, the synchronization signal block #2 509 may be mapped to four consecutive symbols starting from the 3rd OFDM symbol of the 2nd slot, the synchronization signal block #3 510 may be mapped to four consecutive symbols starting from the 7th OFDM symbol of the 2nd slot, the synchronization signal block #4 511 may be mapped to four consecutive symbols starting from the 5th OFDM symbol of the 3rd slot, the synchronization signal block #5 512 may be mapped to four consecutive symbols starting from the 9th OFDM symbol of the 3rd slot, the synchronization signal block #6 513 may be mapped to four consecutive symbols starting from the 13th OFDM symbol of the 3rd slot, and the synchronization signal block #7 514 may be mapped to four consecutive symbols from the 3rd OFDM symbol of the 4th slot.

As described in the above embodiment, different analog beams may be used for the synchronization signal block #0 507, synchronization signal block #1 508, synchronization signal block #2 509, synchronization signal block #3 510, synchronization signal block #4 511, synchronization signal block #5 512, synchronization signal block #6 513, and synchronization signal block #7 514. In addition, the same analog beam may be used in all four OFDM symbols through which the respective synchronization signal blocks are transmitted, and the analog beam to be used in the OFDM symbols to which no synchronization signal block is mapped may be freely determined under the determination of a base station.

Figure 6:
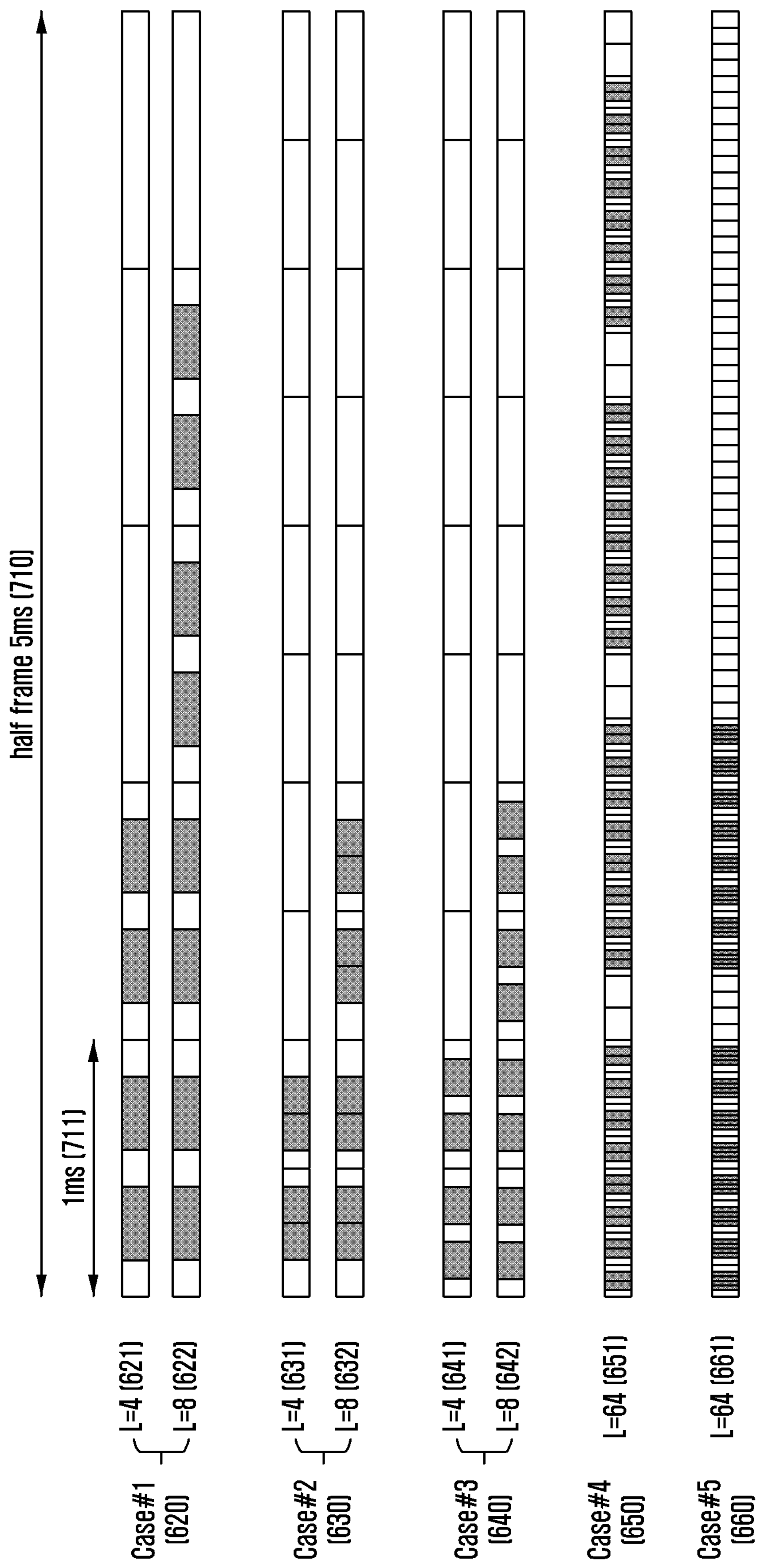
FIG. 6 is a diagram illustrating cases in which a synchronization signal block according to a subcarrier spacing is transmitted within 5 milliseconds (ms) in a wireless communication system, according to an embodiment.

FIG. 6 is a diagram illustrating cases in which a synchronization signal block according to a subcarrier spacing is transmitted within 5 milliseconds (ms) in a wireless communication system, according to an embodiment.

Referring to FIG. 6, in the 5G communication system, a synchronization signal block may be periodically transmitted in units of 5 ms (corresponding to five subframes or half frame 610).

In a frequency band of 3 GHz or less, a maximum of four synchronization signal blocks may be transmitted within 5 ms 610. A maximum of eight synchronization signal blocks may be transmitted in a frequency band greater than 3 GHz and less than or equal to 6 GHz. A maximum of sixty four synchronization signal blocks may be transmitted in the frequency band of higher than 6 GHz. As described above, the 15 kHz subcarrier spacing and 30 kHz subcarrier spacing may be used at frequencies of 6 GHz or less.

With reference to the case #1 620 of FIG. 6, in case #1 401 of the 15 kHz subcarrier spacing configured by one slot of FIG. 4, the synchronization signal blocks may be mapped to the 1st slot and 2nd slot in a frequency band of 3 GHz or less, and accordingly, a maximum of four synchronization signal blocks 621 may be transmitted. In addition, the synchronization signal blocks may be mapped to the 1st, 2nd, 3rd, and 4th slots in a frequency band greater than 3 GHz and less than or equal to 6 GHz, and accordingly, a maximum of eight synchronization signal blocks 622 may be transmitted. With reference to the case #2 630 or the case #3 640 of FIG. 6, in the case #2 402 or the case #3 403 of the 30 kHz subcarrier spacing configured by two slots of FIG. 4, the synchronization signal blocks may be mapped starting from the 1st slot in a frequency band of 3 GHz or less, and accordingly, a maximum of four synchronization signal blocks 631 and 641 may be transmitted. In addition, the synchronization signal blocks may be mapped starting from the 1st and 3rd slots in a frequency band greater than 3 GHz and less than or equal to 6 GHZ, and accordingly, a maximum of eight synchronization signal blocks 632 and 642 may be transmitted.

The 120 kHz subcarrier spacing and 240 kHz subcarrier spacing may be used at frequencies higher than 6 GHz. With reference to the case #4 650 of FIG. 6, in the case #4 510 of the 120 kHz subcarrier spacing configured by two slots of FIG. 5, the synchronization signal blocks may be mapped starting from the 1st, 3rd, 5th, 7th, 11th, 13th, 15th, 17th, 21st, 23rd, 25th, 27th, 31st, 33rd, 35th, and 37th slots in a frequency band greater than 6 GHZ, and accordingly, a maximum of sixty four synchronization signal blocks 651 may be transmitted. With reference to the case #5 660 of FIG. 6, in the case #5 520 of the 240 kHz subcarrier spacing configured by four slots of FIG. 5, the synchronization signal blocks may be mapped starting from the 1st, 5th, 9th, 13th, 21st, 25th, 29th, and 33rd slots in a frequency band greater than 6 GHZ, and accordingly, a maximum of sixty four synchronization signal blocks 661 may be transmitted.

Meanwhile, a UE may decode a PDCCH and PDSCH, based on system information included in a received MIB and acquire an SIB. The SIB may include at least an uplink cell bandwidth, a random access parameter, a paging parameter, and/or a parameter related to uplink power control.

According to an embodiment, to further reduce the capability of the UE, schemes such as reducing the radio frequency (RF) bandwidth from 20 MHz to 5 MHz or reducing the baseband bandwidth from 20 MHz to 5 MHz may be considered. In particular, a scheme is provided in which the RF bandwidth is set to 20 MHz with the remaining channels/signals, except for downlink/uplink data, and the baseband bandwidth for transmitting and receiving downlink/uplink data is reduced to a specific value (hereinafter, in the disclosure, for convenience of explanation, the case where the specific value is 5 MHz is given as an example, but the disclosure is not limited thereto).

First, an initial cell access process for the enhanced RedCap UE to access a cell (or a base station) will be described. In the disclosure, the enhanced RedCap UE may acquire cell synchronization by receiving a synchronization signal block in the initial cell access for accessing a cell (or a base station) as shown in the embodiment of FIG. 4 or 5 and then determine whether the cell supports the enhanced RedCap UE through MIB acquisition, SIB acquisition, or a random access process. Additionally, in case that the cell is determined to support the enhanced RedCap UE, the enhanced RedCap UE may transmit, to the base station, at least one piece of capability information on the bandwidth size of RF or baseband supported in the cell by the enhanced RedCap UE, whether frequency range 1 (FR1) supports reduced baseband bandwidth (or support 25 physical resource blocks (PRBs) in subcarrier spacing of 15 kHz or 12 PRBs in subcarrier spacing of 30 kHz, as the maximum number of PRBs in PDSCH/PUSCH that can be scheduled for unicast), whether FR1 supports a reduced peak data rate (or supports 10 Mbps as a maximum DL/UL peak data rate), whether full-duplex communication or half-duplex communication is supported, the number of transmitting or receiving antennas being provided (or supported), whether the enhanced RedCap UE supports the case where the UE dedicated BWP configured by a higher signal includes CORESET #0 and a synchronization signal block, or whether the enhanced RedCap UE supports the case where the UE dedicated BWP configured by the higher signal does not include CORESET #0 and a synchronization signal block such that the base station can identify that the UE attempting to access is the enhanced RedCap UE. Alternatively, in case that half-duplex communication support is essential implementation for the enhanced RedCap UE, information on whether half-duplex communication is supported may be omitted from the capability information.

The base station may configure separate random access resources for each of a RedCap UE or an enhanced RedCap UE, and transmit the configuration information on the random access resource to the enhanced RedCap UE through system information. The system information for transmitting information on the random access resource may be separately transmitted system information distinguished from system information for a UE supporting a different version of specification within a cell, and the base station may configure separate random access resources for the UE supporting a different version of specification and the enhanced RedCap UE, thereby distinguishing whether the UE supporting a different version of specification performs random access or the enhanced RedCap UE performs random access. In addition, the base station may configure a common random access resource for all UEs in a cell without configuring a separate random access resource for the enhanced RedCap UE. In this case, the configuration information for the random access resource may be transmitted to all UEs in the cell through system information, and the UE having received the system information may perform random access at the random access resource.

Thereafter, the UE may complete the random access process to proceed to the radio resource control (RRC) connection mode for performing transmission and reception of data with the cell.

In general, a UE may form a radio link with a network through a random access procedure, based on system information and synchronization with the network obtained in the cell search process of the cell. A contention-based or contention-free scheme may be used for random access. In case that the UE performs cell selection and reselection in an initial access phase of the cell, for example, contention-based random access scheme may be used for the purpose of state transition from the RRC_IDLE (RRC idle) state to the RRC_CONNECTED (RRC connection) state. Contention-free random access may be used in the case of arrival of downlink data, in the case of a handover, in the case of re-configuring uplink synchronization, and/or in the case of location measurement.

Table 3 below exemplifies the conditions (events) under which the random access procedure is triggered in the 5G system. Reference may be made to TS 38.300 for additional details.

TABLE 3

| |
|---|
| Initial access from RRC_IDLE; |
| RRC Connection Re-establishment procedure; |
| DL or UL data arrival during RRC_CONNECTED when UL synchronization status is "non-synchronized"; |
| UL data arrival during RRC_CONNECTED when there are no PUCCH resources for scheduling request (SR) available; |
| SR failure; |
| Request by RRC upon synchronous reconfiguration (e.g. handover); |
| Transition from RRC_INACTIVE; |
| To establish time alignment for a secondary timing advance group (TAG); |
| Request for Other system information (SI) (see clause 7.3); |
| Beam failure recovery; |

Next, BWP configuration in a 5G communication system will be described in detail with reference to the drawings.

In the 5G communication system, the base station may configure one or a plurality of BWPs to the UE, and may configure the information included in Table 4 below for each BWP.

TABLE 4

```
BWP ::=                  SEQUENCE {
  bwp-Id                    BWP-Id,
  locationAndBandwidth     INTEGER (1..65536),
  subcarrierSpacing        ENUMERATED {n0, n1, n2, n3,
n4, n5},
  cyclicPrefix             ENUMERATED  {  extended  }
}
```

In addition to the above configuration information, various parameters related to the BWP may be configured for the UE. The information may be transmitted, from the base station, to the UE, through higher layer signaling, e.g., RRC signaling. At least one BWP among one or a plurality of configured BWPs may be activated. Whether or not the configured BWP is activated may be semi-statically transmitted from the base station to the UE through RRC signaling or dynamically transmitted through DCI.

The UE, before the RRC connection, may be configured with an initial BWP for initial access, from the base station, through an MIB or SIB 1.

The configurations for CORESET #0, search space #0, and an initial BWP are described below. The UE may receive configuration information about CORESET #0 and search space #0 through which a PDCCH for reception of system information (that may correspond to remaining SI (RMSI) or SIB 1) required for initial access through the MIB in the initial access stage may be transmitted. The CORESET and search space configured using the MIB may be regarded as ID 0.

The base station may notify the UE of configuration information, such as frequency allocation information, time allocation information, and numerology for CORESET #0 through the MIB. In addition, the base station may notify the UE of configuration information related to a monitoring period and an occasion for CORESET #0, i.e., configuration information about search space #0, through the MIB.

In a method for configuring the initial BWP, UEs that have not yet been RRC-connected may receive configuration information about an initial BWP through an MIB in an initial access stage. More specifically, a UE may receive, from the MIB of a PBCH, a configuration of a CORESET for a DL control channel through which DCI for scheduling a SIB is able to be transmitted. The bandwidth of the CORESET configured through the MIB may be regarded as an initial BWP, and the UE may receive a PDSCH through which an SIB is transmitted through the configured initial BWP. The initial BWP may be used for other system information (OSI), paging and random access, in addition to the reception of an SIB.

In the case of a RedCap UE, standardization for complexity reducing schemes such as reducing the RF bandwidth (reducing from 100 MHz to 20 MHz for FR1, and from 200 MHz to 100 MHz for frequency range 2 (FR2)), supporting half-duplex operation capability without supporting full-duplex operation capability that can simultaneously transmit and receive for one serving cell in an frequency division duplexing (FDD) system, and reducing the number of reception antennas from 4 or 2 to 1 or from 2 to 1 may be used to reduce the complexity of the UE.

In a case of an enhanced RedCap UE, schemes such as reducing the RF bandwidth from 20 MHz to 5 MHz or reducing the baseband bandwidth from 20 MHz to 5 MHz may be considered to further reduce the complexity of the UE. In particular, in the disclosure, a scheme is provided in which the RF bandwidth is set to 20 MHz including the remaining channels/signals, except for downlink/uplink data, to maintain a baseband bandwidth of 20 MHz, and the baseband bandwidth for transmitting and receiving downlink/uplink data is reduced to a specific value (alternatively, as the maximum number of PRBs in PDSCH/PUSCH that can be scheduled for unicast at 5 MHz, supporting 25 PRBs in subcarrier spacing of 15 kHz or 12 PRBs in subcarrier spacing of 30 kHz. Hereinafter, in the disclosure, for convenience of description, a case where the specific value is 5 MHz is given as an example, but the disclosure is not limited thereto).

In a situation where the enhanced RedCap UE is provided with a post-fast Fourier Transform (FFT) buffer corresponding to 20 MHz but is capable of processing a 5 MHz baseband, a method and apparatus for receiving downlink channels when multiple downlink channels collide during at least one OFDM symbol duration in different frequency resources are provided. Additionally, in a case where an uplink channel and downlink channel collide during at least one OFDM symbol duration and the enhanced RedCap UE has full-duplex operation capability or half-duplex operation capability, a method and apparatus for transmitting and receiving the channels are provided. Accordingly, in a case where the uplink channel and downlink channel collide during at least one OFDM symbol duration in different frequency resources, a method and apparatus for transmitting and receiving the channels by an enhanced RedCap UE having a full-duplex operation capability or half-duplex operation capability are provided.

Figure 7:
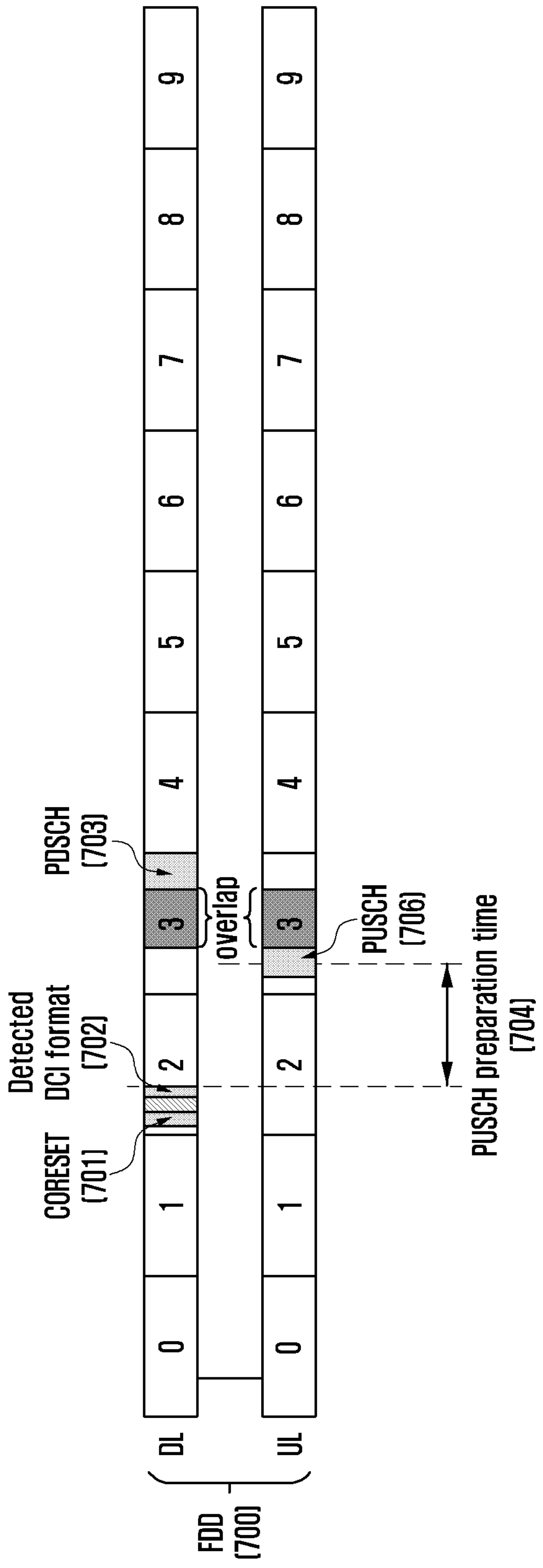
FIG. 7 is a diagram illustrating a method for transmitting and receiving channels by an enhanced RedCap UE when an uplink channel and downlink channel overlap in a wireless communication system, according to an embodiment.

FIG. 7 is a diagram illustrating a method for transmitting and receiving channels by an enhanced RedCap UE when an uplink channel and downlink channel overlap in a wireless communication system, according to an embodiment.

FIG. 7 illustrates the operation of an enhanced RedCap UE in case where DL reception scheduled by a physical signal and UL transmission configured by a higher signal overlap in a time duration. In particular, a situation in which reception of a DL data channel (e.g., PDSCH) by a DL control channel (e.g., PDCCH) and transmission of an UL data/control channel or UL signal for which transmission is configured in advance at a specific resource (e.g., frequency and/or time) by a higher signal occurs simultaneously in a specific time duration (or at least one OFDM symbol) is illustrated. For example, transmission of UL data, a UL control channel or a UL signal may include transmission of configured grant UL data, transmission of hybrid automatic repeat request (HARQ)-acknowledgment (ACK), channel state information (CSI), and/or SR on PUCCH, or transmission of a sounding reference signal (SRS).

FIG. 7 considers a situation in which DL data scheduled mainly by a DL control channel and configured UL data, control channel, and/or an UL signal (hereinafter referred to as UL data/control channel/UL signal) collide in a specific time duration. However, the teachings of FIG. 7 can also be applied to the reception of a DL signal such as CSI-RS instead of the DL data, and it is also possible to be applied to UL transmission such as a random access channel instead of the UL data/control channel/UL signal.

Referring to FIG. 7, in the FDD 700, the enhanced RedCap UE may decode the DCI format 702 for scheduling a DL data channel 703 in a CORESET 701, and determine that the DL data channel 703 is received at a specific resource, such as a specific frequency (or specific RBs) and a specific time (or specific slot or symbols). Additionally, the enhanced RedCap UE can be configured to transmit the UL data/control channel or UL signal 706 on a specific resource by a pre-configured higher signal. The enhanced RedCap UE may determine that the time duration in which the DL data channel 703 is received and the time duration in which transmission of the UL data/control channel or UL signal 706 is pre-configured by a higher signal overlap.

First, a case where the enhanced RedCap UE reports a capability signal that it supports full-duplex communication or a case where the enhanced RedCap UE is configured by a base station to transmit and receive through full-duplex communication will be described.

Even if the reception time duration of the DL data channel 703 overlaps with the time duration for transmission of the UL data/control channel or UL signal 706 pre-configured by a higher signal, in a case where the enhanced RedCap UE reports a capability signal that it supports full-duplex communication or in a case where the enhanced RedCap UE is configured by the base station to transmit or receive through full-duplex communication, the enhanced RedCap UE is capable of simultaneously performing of receiving the DL data channel 703 and transmitting the UL data/control channel or UL signal 706.

Next, a case where the enhanced RedCap UE reports a capability signal that it supports half-duplex communication, or a case where the enhanced RedCap UE is configured by the base station to transmit or receive through half-duplex communication even if the enhanced RedCap UE reports the capability signal that it supports the full-duplex communication (or it does not support half-duplex communication) will be described. In a case where the reception time duration of the DL data channel 703 overlaps with the time duration for transmission of the UL data/control channel or UL signal 706 pre-configured by a higher signal, if the first symbol of the UL data/UL control channel occurs within a PUSCH preparation time 704 from the last symbol of the CORESET 701 receiving the DCI format 702, the enhanced RedCap UE does not expect to cancel transmission of the UL data/UL control channel. That is, the enhanced RedCap UE can transmit the UL data/UL control channel without receiving the DL data channel 703. If the first symbol of the UL data/UL control channel does not occur within the PUSCH preparation time 704 from the last symbol of the CORESET 701 receiving the DCI format 702, the transmission of the UL data/UL control channel may be cancelled. That is, the enhanced RedCap UE may receive the DL data channel 703 without transmitting the UL data/UL control channel.

The PUSCH preparation time 704 is given as a constant value after the last symbol of the CORESET 702, and the constant value is T=(N2+d_21+d_2)*(2048+144)*k*2^(−u)*T_c, d_22). N2 is a value related to the processing capability of the UE and is a constant determined based on the subcarrier spacing (u) of the PDCCH or PUSCH. d_21 is a constant determined based on whether the first symbol of the PUSCH includes only DMRS. d_22 is a constant determined based on whether the DCI format indicates the switch of BWP. d_2 is a value reported by the UE for the PUSCH with a higher priority in a case where the PUCCH and PUSCH have different priorities. k=64, and T_c is the basic time unit of NR and is 1/(480*10^3*4096).

Figure 8:
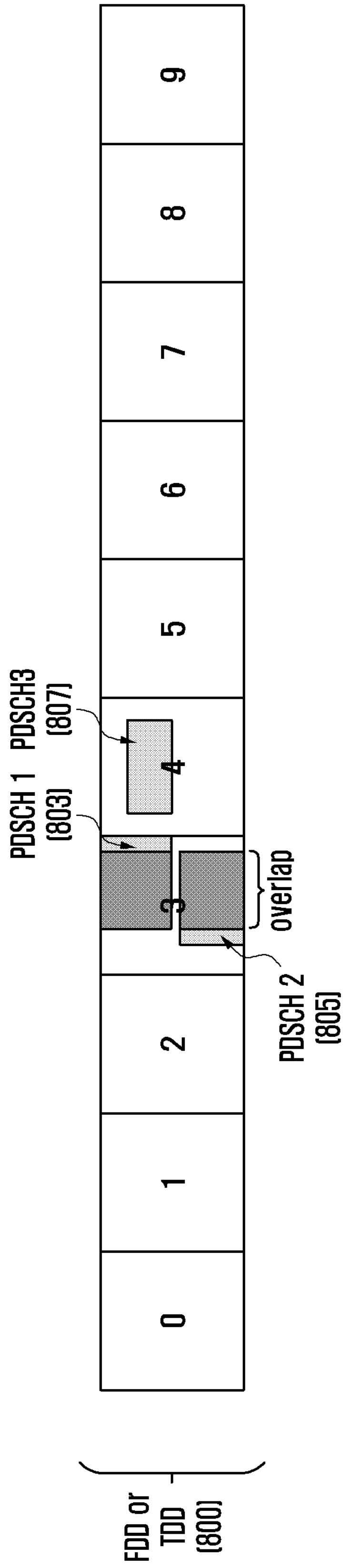
FIG. 8 is a diagram illustrating a method for transmitting and receiving channels by an enhanced RedCap UE in a wireless communication system when downlink channels overlap in a wireless communication system, according to an embodiment.

FIG. 8 is a diagram illustrating a method for transmitting and receiving channels by an enhanced RedCap UE in a wireless communication system when downlink channels overlap in a wireless communication system, according to an embodiment.

FIG. 8 illustrates the operation of an enhanced RedCap UE in a case where DL receptions scheduled by a physical signal overlap in a time duration. In particular, the DL data channels may be DL data channels scheduled as cell radio network temporary identifier (C-RNTI), multipoint control system (MCS)-C-RNTI, cell-specific radio network temporary identifier (CS-RNTI) by a DL control channel (e.g., PDCCH), or may be DL data channels scheduled as system information radio network temporary identifier (SI-RNTI) by another DL control channel during the system information acquisition procedure triggered by paging radio network temporary identifier (P-RNTI). Alternatively, the DL data channel may be a DL data channel scheduled as SI-RNTI by a DL control channel to obtain general SI. The UE operation proposed in FIG. 8 may be applied to both a case where the enhanced RedCap UE reports a capability signal that it supports full-duplex communication or is configured by the base station to transmit and receive through full-duplex communication, a case where the enhanced RedCap UE reports a capability signal that it supports half-duplex communication, and a case where the enhanced RedCap UE is configured by the base station to transmit or receive through half-duplex communication even if the enhanced RedCap UE reports the capability signal that it supports full-duplex communication (it does not support the half-duplex communication).

Referring to FIG. 8, a PDSCH 1 803 may be a DL data channel scheduled as SI-RNTI by a DL control channel, and a PDSCH 2 805 may be a DL data channel scheduled as a C-RNTI, MCS-C-RNTI, and CS-RNTI by another DL control channel. FIG. 8 illustrates a situation where the PDSCH 1 803 and PDSCH 2 805 occur simultaneously in a specific time duration (or at least one OFDM symbol). It is assumed that the total sum of the number of PRBs in the PDSCH 1 803 and the number of PRBs in the PDSCH 2 805 is greater than the maximum number of PRBs that the enhanced RedCap UE can process per slot. For example, it can be assumed that the maximum number of PRBs that the enhanced RedCap UE can process per slot is 25 PRBs in subcarrier spacing of 15 kHz and 12 PRBs in subcarrier spacing of 30 KHz.

In the FDD or time division duplexing (TDD) 800 of FIG. 8, the total sum of the number of PRBs in PDSCH 1 803 and the number of PRBs in PDSCH 2 805 is greater than the maximum number of PRBs that the enhanced RedCap UE can process per slot. Therefore, the enhanced RedCap UE can perform decoding on the PDSCH 2 805, which requires transmitting HARQ-ACK feedback to the base station, before the PDSCH 1 803 including SI. In this case, another PDSCH 3 807 may be scheduled from the base station before the decoding for the PDSCH 2 805 is completed, and before the enhanced RedCap UE completes the decoding for the PDSCH 2 805, so it becomes impossible to store the PDSCH 3 807. To solve the above problem, the following scheme(s) may be proposed.

As a first scheme, in a case where the PDSCH 1 803 and PDSCH 2 805 occur simultaneously in a specific time duration (or at least one OFDM symbol), and the total sum of the number of PRBs in the PDSCH 1 803 and the number of PRBs in the PDSCH 2 805 is greater than the maximum number of PRBs that the enhanced RedCap UE can process per slot, the enhanced RedCap UE may receive the PDSCH 1 803, which is a DL data channel scheduled as SI-RNTI by a DL control channel, and drop or skip the PDSCH 2 805, which is a DL data channel scheduled as C-RNTI, MCS-C-RNTI, and CS-RNTI by another DL control channel. The first scheme may be reasonable in that SI is updated first and PDSCH 2 805 may be retransmitted through HARQ-ACK feedback for the PDSCH 2 805.

As a second scheme, the enhanced RedCap UE may not expect a situation in which the PDSCH 1 803 and PDSCH 2 805 occur simultaneously in a specific time duration (or at least one OFDM symbol), and the total sum of the number of PRBs in the PDSCH 1 803 and the number of PRBs in the PDSCH 2 805 is greater than the maximum number of PRBs that the enhanced RedCap UE can process per slot. In a case where the PDSCH 1 803 and PDSCH 2 805 occur simultaneously in a specific time duration (or at least one OFDM symbol), and the total sum of the number of PRBs in the PDSCH 1 803 and the number of PRBs in the PDSCH 2 805 is greater than the maximum number of PRBs that the enhanced RedCap UE can process per slot, the UE operation may be determined by UE implementation, and whether or not to schedule for the above situation may be determined by base station implementation. For example, the UE may drop or skip the PDSCH 2 805 and receive the PDSCH 1 803, or drop or skip the PDSCH 1 803 and receive the PDSCH 2 805, depending on the UE implementation. However, when the above situation occurs, the base station cannot predict the UE operation.

Figure 9:
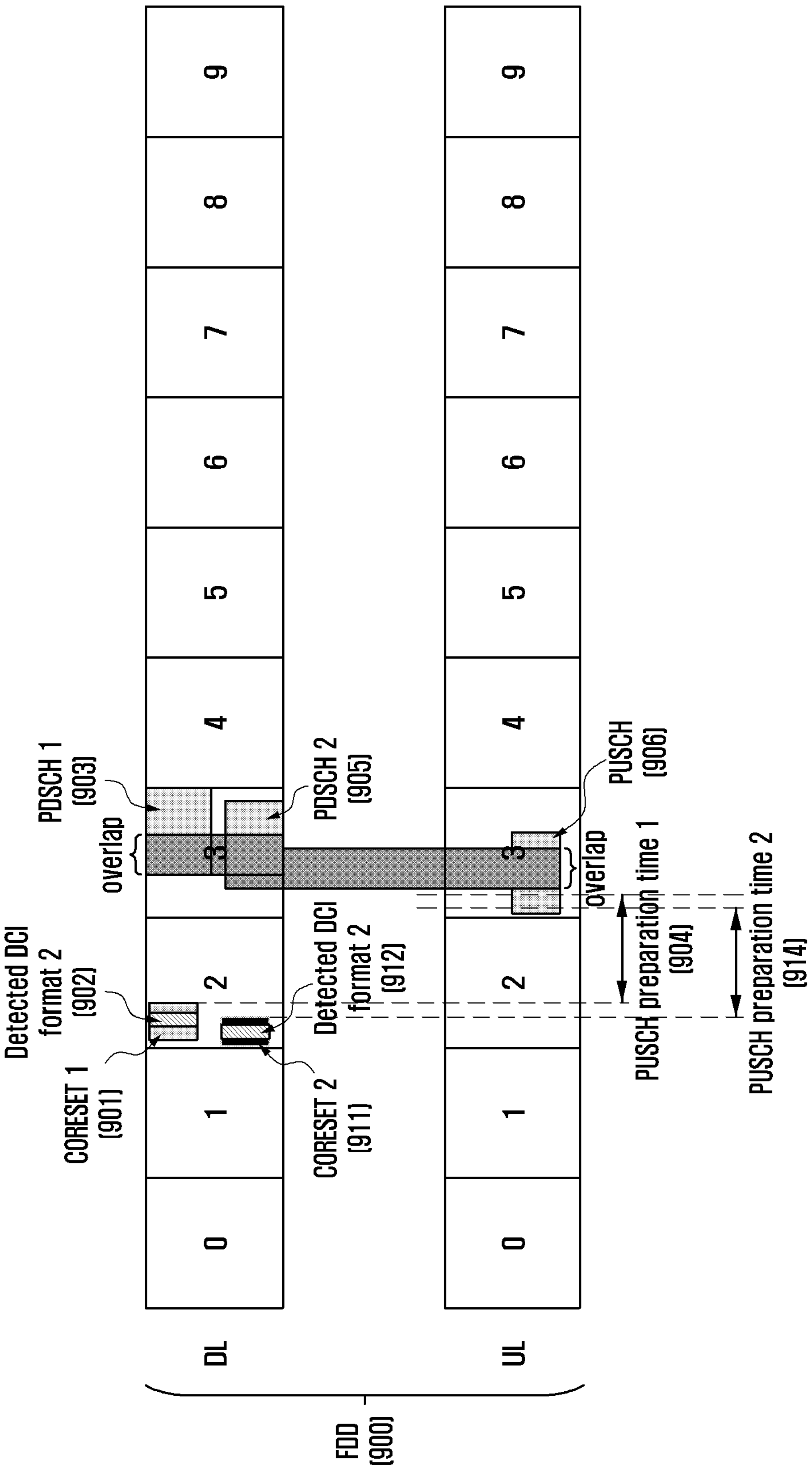
FIG. 9 is a diagram illustrating a method for transmitting and receiving channels by an enhanced RedCap UE when an uplink channel and downlink channels overlap in a wireless communication system, according to an embodiment.

FIG. 9 is a diagram illustrating a method for transmitting and receiving channels by an RedCap UE when an uplink channel and downlink channels overlap in a wireless communication system, according to an embodiment.

FIG. 9 illustrates the operation of an enhanced RedCap UE in a case where multiple DL receptions scheduled by physical signals and UL transmissions configured by higher signals overlap in a time duration. In particular, a situation in which reception of a DL data channel (e.g., PDSCH 1) by a DL control channel (e.g., PDCCH 1) and DL data channel (e.g., PDSCH 2) by another DL control channel (e.g., PDCCH 2) and transmission of an UL data/control channel or UL signal, for which transmission has been configured in advance at a specific resource (e.g., frequency or time) by a higher signal, occur simultaneously in a specific time duration (or at least one OFDM symbol) is illustrated. In FIG. 9, a PDSCH 1 903 may be a DL data channel scheduled as SI-RNTI by a DL control channel, and a PDSCH 2 905 may be a DL data channel scheduled as C-RNTI, MCS-C-RNTI or CS-RNTI by another DL control channel. It is assumed that the total sum of the number of PRBs in the PDSCH 1 903 and the number of PRBs in the PDSCH 2 905 is greater than the maximum number of PRBs that the enhanced RedCap UE can process per slot. For example, it can be assumed that the maximum number of PRBs that the enhanced RedCap UE can process per slot is 25 PRBs in subcarrier spacing of 15 kHz and 12 PRBs in subcarrier spacing of 30 kHz. For example, transmission of the UL data, UL control channel, or UL signal may include transmission of configured grant UL data, transmission of HARQ-ACK, CSI, and/or SR on PUCCH, transmission of SRS.

FIG. 9 considers a situation in which the DL data scheduled mainly by the DL control channel and configured UL data, control channel, and/or UL signal (hereinafter referred to as UL data/control channel/UL signal) collide in a specific time duration. However, it is also possible to be applied to the reception of DL signals such as CSI-RS instead of the DL data, and to UL transmission such as a random access channel instead of the UL data/control channel/UL signal.

Referring to FIG. 9, in the FDD 900, the enhanced RedCap UE may decode DCI faormat 1 902, which schedules the DL data channel PDSCH 1 903 in CORESET 1 901, and may decode DCI format 2 912, which schedules the DL data channel PDSCH 2 905 in another CORESET 2 911. As another example, the enhanced RedCap UE may also decode the DCI format 2 912, which schedules the DL data channel PDSCH 2 905 in the CORESET 1 901. By decoding the DCI formats, it is determined that the DL data channels 903 and 905 are received at a specific resource, such as a specific frequency (or specific RBs) and a specific time (or specific slot, symbols), and it can be seen that the time durations in which DL data channels are received overlap. Additionally, the enhanced RedCap UE may be configured to transmit the UL data/control channel or UL signal 906 on a specific resource by a pre-configured higher signal. In this case, the enhanced RedCap UE may determine that not only the time durations in which the DL data channels are received overlap, but also the time duration in which transmission of the UL data/control channel or UL signal 906 is pre-configured by a higher signal also overlaps. Therefore, when the time durations of the DL data channels and UL data channels overlap, embodiments of the disclosure are provided for various cases according to the order of occurrence of respective channels.

Cases where the enhanced RedCap UE reports a capability signal that indicates that it supports full-duplex communication or is configured by the base station to transmit and receive through full-duplex communication (referred to as full-duplex communication in the embodiments below) are described. Also, a case where the enhanced RedCap UE reports a capability signal indicating it supports half-duplex communication or a case where the enhanced RedCap UE is configured by the base station to transmit or receive through half-duplex communication even if the enhanced RedCap UE reports in the capability signal that it supports full-duplex communication (it does not support the half-duplex communication) (referred to as half-duplex communication in the embodiments below) are described. For the case of half-duplex communication, a solution that considers collisions of channels in the temporal order, a solution that considers collisions of DL channels first, and a solution that first considers collisions between UL channels and DL channels and considers temporal priority for prioritized channels are described, respectively. Although a specific solution has been described for some situations, it is also possible to apply it to other cases.

A case where the first symbol of each channel occurs in the order of a PUSCH 906, PDSCH 1 903, and PDSCH 2 905, and the first symbol of an UL data/UL control channel

906 occurs within a PUSCH preparation time 904 from the last symbol of CORESET 1 901 receiving a DCI format 902 is described below.

- Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.
- Half-duplex communication
  - First, the scheme in FIG. 7 may be applied based on channel collisions in temporal order. That is, the enhanced RedCap UE may apply the scheme in FIG. 7 to transmit the PUSCH 906 and drop or skip the PDSCH 1 903, which is the DL data channel. Also, the enhanced RedCap UE may drop or skip the PDSCH 2 905, which is a DL data channel scheduled as C-RNTI, MCS-C-RNTI, and CS-RNTI by another DL control channel in a case where a collision occurs with the transmission resource of the PUSCH 906, and receive the PDSCH 2 905 in a case where a collision does not occur with the transmission resource of the PUSCH 906.
  - Second, the scheme in FIG. 8 may be applied first based on collisions in DL channels. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL control channel. Next, the enhanced RedCap UE may apply the scheme in FIG. 7 to transmit the PUSCH 906 and drop or skip the PDSCH 1 903, which is the DL data channel, in a case where the PUSCH 906 and PDSCH 1 903 collide. Therefore, in this scheme, the PUSCH 906 is finally transmitted.

A case where the first symbol of each channel occurs in the order of the PUSCH 906, PDSCH 1 903, and PDSCH 2 905, and the first symbol of the UL data/UL control channel 906 does not occur within the PUSCH preparation time 904 from the last symbol of CORESET 1 901 receiving the DCI format 902 is described below.

- Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.
- Half-duplex communication:
  - First, the scheme in FIG. 7 may be applied based on channel collisions in temporal order. That is, the enhanced RedCap UE may apply the scheme in FIG. 7 to cancel the transmission of the PUSCH 906. Furthermore, the enhanced RedCap UE may receive the PDSCH 1 903, which is the DL data channel. The enhanced RedCap UE may apply the first scheme in FIG. 8 to drop or skip the PDSCH 2 905, which is a DL data channel scheduled as C-RNTI, MCS-C-RNTI, and CS-RNTI by another DL control channel.
  - Second, the scheme in FIG. 8 may be applied first based on collisions in DL channels. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL control channel. Next, the enhanced RedCap UE may apply the scheme in FIG. 7 to cancel the transmission of the PUSCH 906 and receive the PDSCH 1 903, which is the DL data channel, in a case where the PUSCH 906 and PDSCH 1 903 collide. Therefore, in this scheme, the PDSCH 1 903 is finally received.

A case where the first symbol of each channel occurs in the order of the PUSCH 906, PDSCH 2 905, and PDSCH 1 903, and the first symbol of the UL data/UL control channel 906 occurs within the PUSCH preparation time 914 from the last symbol of CORESET 2 911 receiving a DCI format 912 is described below.

- Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.
- Half-duplex communication:
  - First, the scheme in FIG. 7 may be applied based on channel collisions in temporal order. That is, the enhanced RedCap UE may apply the scheme in FIG. 7 to transmit the PUSCH 906 and drop or skip the PDSCH 2 905, which is the DL data channel. Also, the enhanced RedCap UE may drop or skip the PDSCH 1 903, which is the DL data channel scheduled as SI-RNTI by another DL control channel in a case where a collision occurs with the transmission resource of the PUSCH 906, and receive the PDSCH 1 903 in a case where a collision does not occur with the transmission resource of the PUSCH 906.
  - Second, the scheme in FIG. 8 may be applied first based on collisions in DL channels. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL control channel. Next, the enhanced RedCap UE may apply the scheme in FIG. 7 to transmit the PUSCH 906 and drop or skip the PDSCH 1 903, which is the DL data channel, in a case where the PUSCH 906 and PDSCH 1 903 collide. Therefore, in this scheme, the PUSCH 906 is finally transmitted.

A case where the first symbol of each channel occurs in the order of the PUSCH 906, PDSCH 2 905, PDSCH 1 903, and the first symbol of the UL data/UL control channel 906 does not occur within the PUSCH preparation time 914 from the last symbol of CORESET 2 911 receiving the DCI format 912 is described below.

- Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.
- Half-duplex communication:
  - First, the scheme in FIG. 7 may be applied based on channel collisions in temporal order. That is, the enhanced RedCap UE may apply the scheme in FIG.

7 to cancel the transmission of the PUSCH 906. Then, the enhanced RedCap UE may apply the first scheme in FIG. 8 to drop or skip the PDSCH 2 905, which is the DL data channel in a case where the PDSCH 2 905 collides with the PDSCH 1 903, which is the DL data channel scheduled as SI-RNTI by another DL control channel. That is, the enhanced RedCap UE may receive the PDSCH 1 903.

Second, the scheme in FIG. 8 may be applied first based on collisions in DL channels. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL control channel. Next, the enhanced RedCap UE may apply the scheme in FIG. 7 to cancel the transmission of the PUSCH 906 and receive the PDSCH 1 903, which is the DL data channel, in a case where the PUSCH 906 and PDSCH 1 903 collide. Therefore, in this scheme, the PDSCH 1 903 is finally received.

A case where the first symbol of each channel occurs in the order of the PDSCH 1 903, PUSCH 906, PDSCH 2 905, and the first symbol of the UL data/UL control channel 906 occurs within the PUSCH preparation time 904 from the last symbol of CORESET 1 901 receiving the DCI format 902 is described below.

Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.

Half-duplex communication:

First, the scheme in FIG. 7 may be applied based on channel collisions in temporal order. That is, the enhanced RedCap UE may apply the scheme in FIG. 7 to transmit the PUSCH 906 and drop or skip the PDSCH 1 903, which is the DL data channel. Also, the enhanced RedCap UE may drop or skip the PDSCH 2 905, which is the DL data channel scheduled as C-RNTI, MCS-C-RNTI, and CS-RNTI by another DL control channel in a case where a collision occurs with the transmission resource of the PUSCH 906, and receive the PDSCH 2 905 in a case where a collision does not occur with the transmission resource of the PUSCH 906.

Second, the scheme in FIG. 8 may be applied first based on collisions in DL channels. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL control channel. Next, the enhanced RedCap UE may apply the scheme in FIG. 7 to transmit the PUSCH 906 and drop or skip the PDSCH 1 903, which is the DL data channel, in a case where the PUSCH 906 and PDSCH 1 903 collide. Therefore, in this scheme, the PUSCH 906 is finally transmitted.

Third, collisions with PUSCH may be considered for each PDSCH. First, the enhanced RedCap UE applies the scheme in FIG. 7 in consideration of the collision between the PDSCH 1 903 and the PUSCH 906, and if the first symbol of the PUSCH 906 occurs within the PUSCH preparation time 904 from the last symbol of CORESET 1 901 that has received the DCI format 902 of the PDSCH 1 903, the enhanced RedCap UE may cancel the reception of the PDSCH 1 903 and prioritize the transmission of the PUSCH 906. Next, the enhanced RedCap UE applies the scheme in FIG. 7 based on the collision between the PDSCH 2 905 and the PUSCH 906, and if the first symbol of the PUSCH 906 occurs within the PUSCH preparation time 914 from the last symbol of CORESET 2 911 that has received the DCI format 912 of the PDSCH 2 905, the enhanced RedCap UE may prioritize the PUSCH 906 in a case where the PDSCH 2 905 and the PUSCH 906 collide. If the first symbol of the PUSCH 906 does not occur within the PUSCH preparation time 914 from the last symbol of CORESET 2 911 that has received the DCI format 912 of the PDSCH 2 905, the enhanced RedCap UE may prioritize the PDSCH 2 905 in a case where the PDSCH 2 905 and the PUSCH 906 collide. In a case where the PUSCH 906 is given priority in the collision between the PDSCH 2 905 and the PUSCH 906, the PUSCH 906 is given priority in the collision between the PDSCH 1 903 and the PUSCH 906, so the PUSCH 906 may be finally transmitted. In a case where the PDSCH 2 905 is given priority in the collision between the PDSCH 2 905 and the PUSCH 906, the PUSCH 906, which occurs first in a temporal order, may be finally transmitted.

A case where the first symbol of each channel occurs in the order of the PDSCH 1 903, PUSCH 906, PDSCH 2 905, and the first symbol of the UL data/UL control channel 906 does not occur within the PUSCH preparation time 904 from the last symbol of CORESET 1 901 receiving the DCI format 902 is described below.

Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.

Half-duplex communication:

First, the scheme in FIG. 7 may be applied based on channel collisions in temporal order. That is, the enhanced RedCap UE may apply the scheme in FIG. 7 to cancel the transmission of the PUSCH 906. Furthermore, the enhanced RedCap UE may receive the PDSCH 1 903, which is the DL data channel. Also, the enhanced RedCap UE may apply the first scheme in FIG. 8 to drop or skip the PDSCH 2 905, which is the DL data channel scheduled as C-RNTI, MCS-C-RNTI, and CS-RNTI by another DL control channel.

Second, the scheme in FIG. 8 may be applied first based on collisions in DL channels. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL control channel. Next, the enhanced RedCap UE may apply the scheme in FIG. 7 to cancel the transmission of the PUSCH 906 and receive the PDSCH 1 903, which is the DL data channel, in a case where the PUSCH 906 and PDSCH 1 903 collide. Therefore, in this scheme, the PDSCH 1 903 is finally received.

Third, collisions with PUSCH may be considered for each PDSCH. First, the enhanced RedCap UE applies the scheme in FIG. 7 based on the collision between the PDSCH 1 903 and the PUSCH 906, and if the first symbol of the PUSCH 906 does not occurs within the PUSCH preparation time 904 from the last symbol of CORESET 1 901 that has received the DCI format 902 of the PDSCH 1 903, the enhanced RedCap UE may cancel the transmission of the PUSCH 906 and prioritize the reception of the PDSCH 1 903. Next, the enhanced RedCap UE applies the scheme in FIG. 7 based on the collision between the PDSCH 2 905 and the PUSCH 906, and if the first symbol of the PUSCH 906 occurs within the PUSCH preparation time 914 from the last symbol of CORESET 2 911 that has received the DCI format 912 of the PDSCH 2 905, the enhanced RedCap UE may prioritize the PUSCH 906 in a case where the PDSCH 2 905 and the PUSCH 906 collide. If the first symbol of the PUSCH 906 does not occur within the PUSCH preparation time 914 from the last symbol of CORESET 2 911 that has received the DCI format 912 of the PDSCH 2 905, the enhanced RedCap UE may prioritize the PDSCH 2 905 in a case where the PDSCH 2 905 and the PUSCH 906 collide. In a case where the PUSCH 906 is given priority in the collision between the PDSCH 2 905 and the PUSCH 906, the PDSCH 1 903 is given priority in the collision between the PDSCH 1 903 and the PUSCH 906, so the PDSCH 1 903 may be finally received. In a case where the PDSCH 2 905 is given priority in the collision between the PDSCH 2 905 and the PUSCH 906, the scheme in FIG. 8 is applied, and thus, the PDSCH 1 903 may be finally received.

A case where the first symbol of each channel occurs in the order of the PDSCH 2 905, PUSCH 906, and PDSCH 1 903, and the first symbol of the UL data/UL control channel 906 occurs within the PUSCH preparation time 914 from the last symbol of CORESET 2 911 receiving the DCI format 912 is described below.

Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.

Half-duplex communication:

First, the scheme in FIG. 7 may be applied based on channel collisions in temporal order. That is, the enhanced RedCap UE may apply the scheme in FIG. 7 to transmit the PUSCH 906 and drop or skip the PDSCH 2 905, which is the DL data channel. Also, the enhanced RedCap UE may drop or skip the PDSCH 1 903, which is the DL data channel scheduled as SI-RNTI by another DL control channel in a case where a collision occurs with the transmission resource of the PUSCH 906, and receive the PDSCH 1 903 in a case where a collision does not occur with the transmission resource of the PUSCH 906.

Second, the scheme in FIG. 8 may be applied first based on collisions in DL channels. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL control channel. Next, the enhanced RedCap UE may apply the scheme in FIG. 7 to transmit the PUSCH 906 and drop or skip the PDSCH 1 903, which is the DL data channel, in a case where the PUSCH 906 and PDSCH 1 903 collide. Therefore, in this scheme, the PUSCH 906 is finally transmitted.

Third, collisions with PUSCH may be considered for each PDSCH. First, the enhanced RedCap UE applies the scheme in FIG. 7 based on the collision between the PDSCH 2 905 and the PUSCH 906, and if the first symbol of the PUSCH 906 occurs within the PUSCH preparation time 914 from the last symbol of CORESET 2 911 that has received the DCI format 912 of the PDSCH 2 905, the enhanced RedCap UE may cancel the reception of the PDSCH 2 905 and prioritize the transmission of the PUSCH 906. Next, the enhanced RedCap UE applies the scheme in FIG. 7 based on the collision between the PDSCH 1 903 and the PUSCH 906, and if the first symbol of the PUSCH 906 occurs within the PUSCH preparation time 904 from the last symbol of CORESET 1 901 that has received the DCI format 902 of the PDSCH 1 903, the enhanced RedCap UE may prioritize the PUSCH 906 in a case where the PDSCH 1 903 and the PUSCH 906 collide. If the first symbol of the PUSCH 906 does not occur within the PUSCH preparation time 904 from the last symbol of CORESET 1 901 that has received the DCI format 902 of the PDSCH 1 903, the enhanced RedCap UE may prioritize the PDSCH 1 903 in a case where the PDSCH 1 903 and the PUSCH 906 collide. In a case where the PUSCH 906 is given priority in the collision between the PDSCH 1 903 and the PUSCH 906, the PUSCH 906 is given priority in the collision between the PDSCH 2 905 and the PUSCH 906, so the PUSCH 906 may be finally transmitted. In a case where the PDSCH 1 903 is given priority in the collision between the PDSCH 1 903 and the PUSCH 906, the PUSCH 906, which occurs first in a temporal order, may be finally transmitted.

A case where the first symbol of each channel occurs in the order of the PDSCH 2 905, PUSCH 906, and PDSCH 1 903, and the first symbol of the UL data/UL control channel 906 does not occur within the PUSCH preparation time 914 from the last symbol of CORESET 2 911 receiving the DCI format 912 is described below.

Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.

Half-duplex communication:

First, the scheme in FIG. 7 may be applied based on channel collisions in temporal order. That is, the enhanced RedCap UE may apply the scheme in FIG. 7 to cancel the transmission of the PUSCH 906 and receive the PDSCH 2 905. Accordingly, the enhanced RedCap UE may drop or skip the PDSCH 1 903 in a case where the PDSCH 2 905, which is the DL data channel, and the PDSCH 1 903, which is the DL data channel scheduled as SI-RNTI by another DL control channel, collide. That is, the enhanced RedCap UE may finally receive the PDSCH 2 905.

Second, the scheme in FIG. 8 may be applied first based on collisions in DL channels. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL control channel. Next, the enhanced RedCap UE may apply the scheme in FIG. 7 to cancel the transmission of the PUSCH 906 and receive the PDSCH 1 903, which is the DL data channel, in a case where the PUSCH 906 and PDSCH 1 903 collide. Therefore, in this scheme, the PDSCH 1 903 is finally received.

Third, collisions with PUSCH may be considered for each PDSCH. First, the enhanced RedCap UE applies the scheme in FIG. 7 based on the collision between the PDSCH 2 905 and the PUSCH 906, and if the first symbol of the PUSCH 906 does not occur within the PUSCH preparation time 914 from the last symbol of CORESET 2 911 that has received the DCI format 912 of the PDSCH 2 905, the enhanced RedCap UE may cancel the transmission of the PUSCH 906 and prioritize the reception of the PDSCH 2 905. Next, the enhanced RedCap UE applies the scheme in FIG. 7 based on the collision between the PDSCH 1 903 and the PUSCH 906, and if the first symbol of the PUSCH 906 occurs within the PUSCH preparation time 904 from the last symbol of CORESET 1 901 that has received the DCI format 902 of the PDSCH 1 903, the enhanced RedCap UE may prioritize the PUSCH 906 in a case where the PDSCH 1 903 and the PUSCH 906 collide. If the first symbol of the PUSCH 906 does not occur within the PUSCH preparation time 904 from the last symbol of CORESET 1 901 that has received the DCI format 902 of the PDSCH 1 903, the enhanced RedCap UE may prioritize the PDSCH 1 903 in a case where the PDSCH 1 903 and the PUSCH 906 collide. In a case where the PUSCH 906 is given priority in the collision between the PDSCH 1 903 and the PUSCH 906, the PUSCH 906 is given priority in the collision between the PDSCH 2 905 and the PUSCH 906, so the PDSCH 2 905 may be finally received. In a case where the PDSCH 1 903 is given priority in the collision between the PDSCH 1 903 and the PUSCH 906, the scheme in FIG. 8 is applied, and thus, the PDSCH 1 903 may be finally received.

A case where the first symbol of each channel occurs in the order of the PDSCH 1 903, PDSCH 2 905, and PUSCH 906, and the first symbol of the UL data/UL control channel 906 occurs within the PUSCH preparation time 904 from the last symbol of CORESET 1 901 receiving the DCI format 902.

Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.

Half-duplex communication:

First, the scheme in FIG. 8 may be applied based on channel collisions in temporal order. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL control channel. Next, the enhanced RedCap UE may apply the scheme in FIG. 7 to transmit the PUSCH 906 and drop or skip the PDSCH 1 903, which is the DL data channel, in a case where the PUSCH 906 and PDSCH 1 903 collide. Accordingly, in this scheme, the PUSCH 906 is finally transmitted.

A case where the first symbol of each channel occurs in the order of the PDSCH 1 903, PDSCH 2 905, and PUSCH 906, and the first symbol of the UL data/UL control channel 906 does not occur within the PUSCH preparation time 904 from the last symbol of CORESET 1 901 receiving the DCI format 902 is described below.

Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.

Half-duplex communication:

First, the scheme in FIG. 8 may be applied based on channel collisions in temporal order. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL control channel. Next, the enhanced RedCap UE may apply the scheme in FIG. 7 to cancel the transmission of the PUSCH 906 and receive the PDSCH 1 903, which is the DL data channel, in a case where the PUSCH 906 and PDSCH 1 903 collide. Accordingly, in this scheme, the PDSCH 1 903 is finally received.

A case where the first symbol of each channel occurs in the order of the PDSCH 2 905, PDSCH 1 903, and PUSCH 906, and the first symbol of the UL data/UL control channel 906 occurs within the PUSCH preparation time 914 from the last symbol of CORESET 2 911 receiving the DCI format 912 is described below.

Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.

Half-duplex communication:

First, the scheme in FIG. 8 may be applied based on channel collisions in temporal order. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL data channel. Next, the enhanced RedCap UE may apply the scheme in FIG. 7 to transmit the PUSCH 906 and drop or skip the PDSCH 1 903, which is the DL data channel, in a case where the PUSCH 906 and PDSCH 1 903 collide. Accordingly, in this scheme, the PUSCH 906 is finally transmitted.

A case where the first symbol of each channel occurs in the order of the PDSCH 2 905, PDSCH 1 903, and PUSCH 906, and the first symbol of the UL data/UL control channel 906 does not occur within the PUSCH preparation time 914 from the last symbol of CORESET 2 911 receiving the DCI format 912 is described below.

Full-duplex communication: The enhanced RedCap UE is capable of transmitting the UL data/control channel or UL signal 906, and at the same time, applying the first scheme in FIG. 8 to receive the PDSCH 1 903, which is the DL data channel scheduled as SI-RNTI, and drop or skip the PDSCH 2 905, which is the DL data channel scheduled as C-RNTI, MCS-C-RNTI, and CS-RNTI by another DL control channel.

Half-duplex communication:

First, the scheme in FIG. 8 may be applied based on channel collisions in temporal order. That is, the enhanced RedCap UE may apply the scheme in FIG. 8, and determine to receive the PDSCH 1 903, which is the DL data channel and drop or skip the PDSCH 2 905, which is the DL data channel scheduled as C-RNTI, MCS-C-RNTI, and CS-RNTI by another DL control channel. Next, the enhanced RedCap UE may apply the scheme in FIG. 7 to cancel the transmission of the PUSCH 906 and receive the PDSCH 1 903, which is the DL data channel, in a case where the PUSCH 906 and PDSCH 1 903 collide. Accordingly, in this scheme, the PDSCH 1 903 is finally received.

Figure 10:
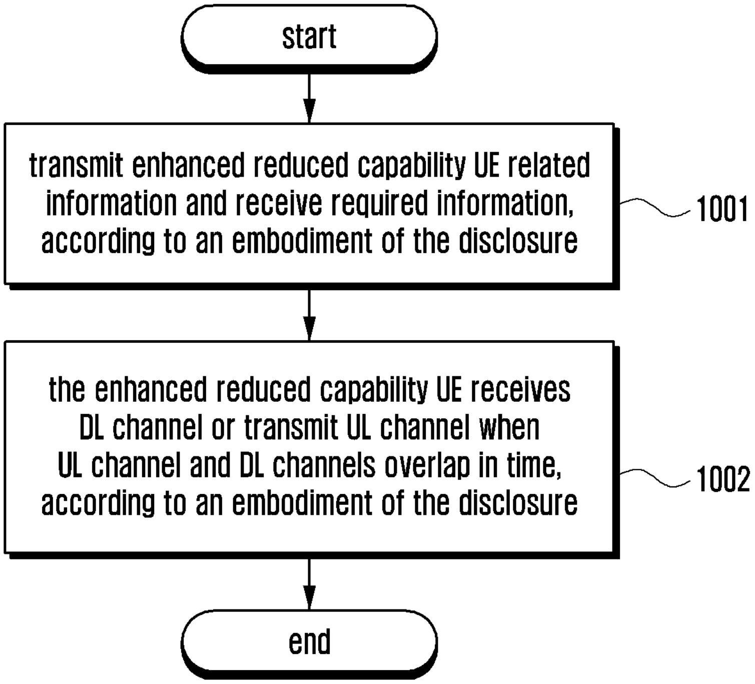
FIG. 10 is a flowchart illustrating a procedure performed by a UE in a wireless communication system, according to an embodiment.

FIG. 10 is a flowchart illustrating a procedure performed by a UE in a wireless communication system, according to an embodiment.

Referring to FIG. 10, in step 1001, the enhanced RedCap UE receives configuration information including at least one of information required for DL channel reception and UL channel transmission, TDD or FDD cell information, resource information about a configuration-based DL signal, resource information about a configuration-based UL signal, full-duplex communication configuration information, and half-duplex communication configuration information, according to embodiments of the disclosure. The configuration information may be provided to the UE through SIB, RRC information, or DCI. Additionally, the enhanced RedCap UE may transmit capability information of the enhanced RedCap UE to the base station.

In step 1002, the enhanced RedCap UE receives a DL channel or transmits a UL channel when the UL channel and DL channels overlap in time based on the information received from the base station, according to embodiments of the disclosure.

Figure 11:
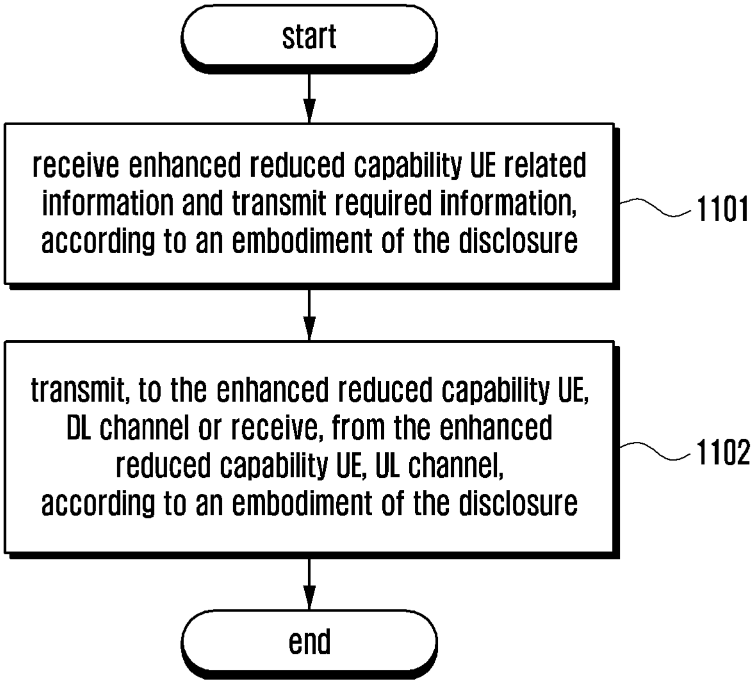
FIG. 11 is a flowchart illustrating a procedure performed by a base station in a wireless communication system, according to an embodiment.

FIG. 11 is a flowchart illustrating a procedure performed by a base station in a wireless communication system, according to an embodiment.

Referring to FIG. 11, in step 1101, the base station may transmit, to the enhanced RedCap UE, configuration information including at least one of information required for DL channel reception and UL channel transmission, TDD or FDD cell information, resource information about a configuration-based DL signal, resource information about a configuration-based UL signal, full-duplex communication configuration information, and half-duplex communication configuration information, according to embodiments of the disclosure. The configuration information may be provided to the UE through SIB, RRC information or DCI. Additionally, the base station may receive, from the enhanced RedCap UE, the capability information of the enhanced RedCap UE.

In step 1102, the base station may transmit a DL channel to the enhanced RedCap UE according to embodiments of the disclosure, or receive a UL channel from the enhanced RedCap UE according to embodiments of the disclosure.

Figure 12:
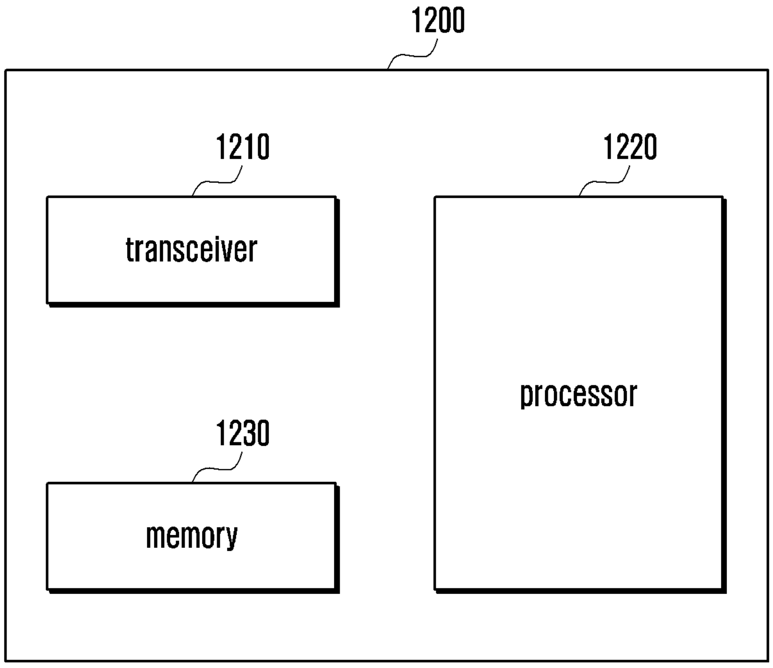
FIG. 12 is a block diagram of a UE, according to an embodiment.

FIG. 12 is a block diagram of a UE, according to an embodiment.

Referring to FIG. 12, a UE 1200 includes a transceiver 1210, a processor 1220, and a memory 1230. As described above with reference to FIGS. 1-6, the UE 1200 according to the disclosure may operate according to the scheme described in the embodiments of FIGS. 7-9 in a wireless communication system to which the disclosure is applied. However, according to an embodiment, the components of the UE 1200 are not limited to the above-described example. According to another embodiment, the UE 1200 may further include more components than the above-described components, or may include fewer components in case of the enhanced RedCap UE. In addition, in a specific case, the transceiver 1210, processor 1220, and memory 1230 may be implemented in a single chip.

The transceiver 1210 may include a transmitter and a receiver. The transceiver 1210 may transmit and receive signals to and from the base station. The signals may include control information and data. To this end, the transceiver 1210 may include an RF transmitter that up-converts and amplifies the frequency of a transmitted signal and/or an RF receiver that low-noise amplifies a received signal and down-converts the frequency thereof. Further, the transceiver 1210 may receive a signal through a radio channel, output the signal through the processor 1220, and transmit the signal output from the processor 1220 through a radio channel.

The processor 1220 may control a series of processes operable by the UE 1200 according to the above-described embodiment of the disclosure.

The memory 1230 may store control information or data such as transmission resource configuration(s) included in a signal obtained from the UE 1200 and may have a region for storing data required for control of the processor 1220 and/or data generated during control by the processor 1220.

Figure 13:
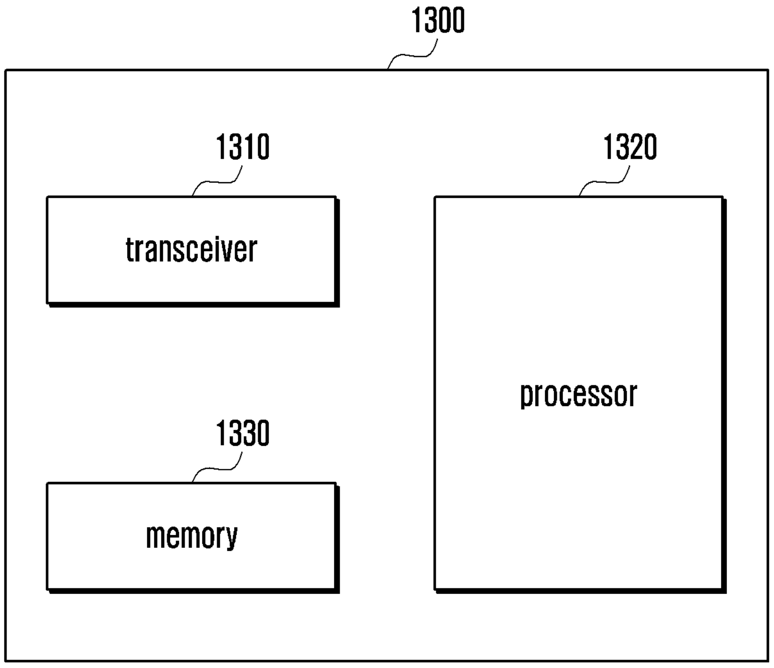
FIG. 13 is a block diagram of a base station, according to an embodiment.

FIG. 13 is a block diagram of a base station, according to an embodiment.

Referring to FIG. 13, a base station 1300 includes a transceiver 1310, a processor 1320, and a memory 1330. As described above with reference to FIGS. 1-6, the base station 1300 according to the disclosure may operate according to the schemes described in the embodiments of FIGS. 7-9 in a wireless communication system to which the disclosure is applied. However, according to an embodiment, the components of the base station 1300 are not limited to the above-described example. According to another embodiment, the base station 1300 may further include more components than the above-described components, or may include fewer components. In addition, in a specific case, the transceiver 1310, processor 1320, and memory 1330 may be implemented in a single chip. The transceiver 1310 may include a transmitter and a receiver according to another embodiment. The transceiver 1310 may transmit and receive signals to and from the UE. The signals may include control information and data. To this end, the transceiver 1310 may include an RF transmitter that up-converts and amplifies the frequency of a transmitted signal and/or an RF receiver that low-noise amplifies a received signal and down-converts the frequency thereof. Further, the transceiver 1310 may receive a signal through a radio channel, output the signal through the processor 1320, and transmit the signal output from the processor 1320 through a radio channel.

The processor 1320 may control a series of processes operable by the base station 1300 according to the above-described embodiment of the disclosure. The memory 1330 may store control information and data such as transmission resource configuration(s) determined by the base station 1300 or control information and data received from the UE and may have a region for storing data required for control of the processor 1320 and data generated during control by the processor 1320.

Meanwhile, the embodiments of the disclosure disclosed in this specification and drawings are merely provided as specific examples to explain the technical content of the disclosure and aid understanding of the disclosure, and are not intended to limit the scope of the disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a user equipment (UE) in a communication system, the method comprising:

identifying a first physical downlink shared channel (PDSCH) scheduled by first downlink control information (DCI) associated with a first control resource set (CORESET);

identifying a second PDSCH scheduled by second DCI associated with a second CORESET;

identifying a physical uplink shared channel (PUSCH);

identifying that the first PDSCH, the second PDSCH and the PUSCH are overlapped in time, wherein a first symbol of the PUSCH is between a first symbol of the first PDSCH and a first symbol of the second PDSCH; and receiving the first PDSCH or the second PDSCH, or transmitting the PUSCH.

2. The method of claim 1, wherein, in case that the UE operates based on full-duplex, the method further comprises:

determining a PDSCH among the first PDSCH and the second PDSCH based on radio network temporary identifiers (RNTIs) associated with the first PDSCH and the second PDSCH; and receiving the determined PDSCH and transmitting the PUSCH.

3. The method of claim 1, wherein in case that the UE operates based on half-duplex, the method further comprises:

identifying whether the first symbol of the PUSCH is within a preparation time from a CORESET associated with an earlier PDSCH among the first PDSCH and the second PDSCH; and receiving the earlier PDSCH or transmitting the PUSCH based on whether the first symbol of the PUSCH is within the preparation time from the CORESET associated with the earlier PDSCH.

4. The method of claim 1, wherein in case that the UE operates based on half-duplex, the method further comprises:

determining a PDSCH among the first PDSCH and the second PDSCH based on a first radio network temporary identifier (RNTI) associated with the first PDSCH and a second RNTI associated with the second PDSCH;

identifying whether the first symbol of the PUSCH is within a preparation time from a CORESET associated with the determined PDSCH; and receiving the determined PDSCH or transmitting the PUSCH based on whether the first symbol of the PUSCH is within the preparation time from the CORESET associated with the determined PDSCH.

5. The method of claim 1, wherein in case that the UE operates based on half-duplex, the method further comprises:

determining either the first PDSCH or the PUSCH based on whether the PUSCH is within a preparation time from the first CORESET;

determining either the second PDSCH or the PUSCH based on whether the PUSCH is within the preparation time from the second CORESET; and based on a determined channel between the first PDSCH and the PUSCH and a determined channel between the second PDSCH and the PUSCH, receiving the first PDSCH or the second PDSCH, or transmitting the PUSCH.

6. A method performed by a base station in a communication system, the method comprising:

identifying a first physical downlink shared channel (PDSCH) scheduled by first downlink control information (DCI) associated with a first control resource set (CORESET);

identifying a second PDSCH scheduled by second DCI associated with a second CORESET;

identifying a physical uplink shared channel (PUSCH);

identifying that the first PDSCH, the second PDSCH and the PUSCH are overlapped in time, wherein a first symbol of the PUSCH is between a first symbol of the first PDSCH and a first symbol of the second PDSCH; and transmitting the first PDSCH or the second PDSCH, or receiving the PUSCH.

7. The method of claim 6, wherein, in case that a user equipment (UE) operates based on full-duplex, the method further comprises:

determining a PDSCH among the first PDSCH and the second PDSCH based on radio network temporary identifiers (RNTIs) associated with the first PDSCH and the second PDSCH; and transmitting the determined PDSCH and receiving the PUSCH.

8. The method of claim 6, wherein in case that a user equipment (UE) operates based on half-duplex, the method further comprises:

identifying whether the first symbol of the PUSCH is within a preparation time from a CORESET associated with an earlier PDSCH among the first PDSCH and the second PDSCH; and transmitting the earlier PDSCH or receiving the PUSCH based on whether the first symbol of the PUSCH is within the preparation time from the CORESET associated with the earlier PDSCH.

9. The method of claim 6, wherein in case that a user equipment (UE) operates based on half-duplex, the method further comprises:

determining a PDSCH among the first PDSCH and the second PDSCH based on a first radio network temporary identifier (RNTI) associated with the first PDSCH and a second RNTI associated with the second PDSCH;

identifying whether the first symbol of the PUSCH is within a preparation time from a CORESET associated with the determined PDSCH; and transmitting the determined PDSCH or receiving the PUSCH based on whether the first symbol of the PUSCH is within the preparation time from the CORESET associated with the determined PDSCH.

10. The method of claim 6, wherein in case that a user equipment (UE) operates based on half-duplex, the method further comprises:

determining either the first PDSCH or the PUSCH based on whether the PUSCH is within a preparation time from the first CORESET;

determining either the second PDSCH or the PUSCH based on whether the PUSCH is within the preparation time from the second CORESET; and based on a determined channel between the first PDSCH and the PUSCH and a determined channel between the second PDSCH and the PUSCH, transmitting the first PDSCH or the second PDSCH, or receiving the PUSCH.

11. A user equipment (UE) in a communication system, the UE comprising:

a transceiver; and at least one processor configured to:

identify a first physical downlink shared channel (PDSCH) scheduled by first downlink control information (DCI) associated with a first control resource set (CORESET);

identify a second PDSCH scheduled by second DCI associated with a second CORESET;

identify a physical uplink shared channel (PUSCH);

identify that the first PDSCH, the second PDSCH and the PUSCH are overlapped in time, wherein a first symbol of the PUSCH is between a first symbol of the first PDSCH and a first symbol of the second PDSCH; and receive the first PDSCH or the second PDSCH, or transmit the PUSCH.

12. The UE of claim 11, wherein, in case that the UE operates based on full-duplex, the at least one processor is further configured to:

determine a PDSCH among the first PDSCH and the second PDSCH based on radio network temporary identifiers (RNTIs) associated with the first PDSCH and the second PDSCH; and receive the determined PDSCH and transmit the PUSCH.

13. The UE of claim 11, wherein in case that the UE operates based on half-duplex, the at least one processor is further configured to:

identify whether the first symbol of the PUSCH is within a preparation time from a CORESET associated with an earlier PDSCH among the first PDSCH and the second PDSCH; and receive the earlier PDSCH or transmit the PUSCH based on whether the first symbol of the PUSCH is within the preparation time from the CORESET associated with the earlier PDSCH.

14. The UE of claim 11, wherein in case that the UE operates based on half-duplex, the at least one processor is further configured to:

determine a PDSCH among the first PDSCH and the second PDSCH based on a first radio network temporary identifier (RNTI) associated with the first PDSCH and a second RNTI associated with the second PDSCH;

identify whether the first symbol of the PUSCH is within a preparation time from a CORESET associated with the determined PDSCH; and receive the determined PDSCH or transmit the PUSCH based on whether the first symbol of the PUSCH is within the preparation time from the CORESET associated with the determined PDSCH.

15. The UE of claim 11, wherein in case that the UE operates based on half-duplex, the at least one processor is further configured to:

determine either the first PDSCH or the PUSCH based on whether the PUSCH is within a preparation time from the first CORESET;

determine either the second PDSCH or the PUSCH based on whether the PUSCH is within the preparation time from the second CORESET; and based on a determined channel between the first PDSCH and the PUSCH and a determined channel between the second PDSCH and the PUSCH, receive the first PDSCH or the second PDSCH, or transmit the PUSCH.

16. A base station in a communication system, the base station comprising:

a transceiver; and at least one processor configured to:

identify a first physical downlink shared channel (PDSCH) scheduled by first downlink control information (DCI) associated with a first control resource set (CORESET);

identify a second PDSCH scheduled by second DCI associated with a second CORESET;

identify a physical uplink shared channel (PUSCH);

identify that the first PDSCH, the second PDSCH and the PUSCH are overlapped in time, wherein a first symbol of the PUSCH is between a first symbol of the first PDSCH and a first symbol of the second PDSCH; and transmit the first PDSCH or the second PDSCH, or receive the PUSCH.

17. The base station of claim 16, wherein, in case that a user equipment (UE) operates based on full-duplex, the at least one processor is further configured to:

determine a PDSCH among the first PDSCH and the second PDSCH based on radio network temporary identifiers (RNTIs) associated with the first PDSCH and the second PDSCH; and transmit the determined PDSCH and receive the PUSCH.

18. The base station of claim 16, wherein in case that a user equipment (UE) operates based on half-duplex, the at least one processor is further configured to:

identify whether the first symbol of the PUSCH is within a preparation time from a CORESET associated with an earlier PDSCH among the first PDSCH and the second PDSCH; and transmit the earlier PDSCH or receive the PUSCH based on whether the first symbol of the PUSCH is within the preparation time from the CORESET associated with the earlier PDSCH.

19. The base station of claim 16, wherein in case that a user equipment (UE) operates based on half-duplex, the at least one processor is further configured to:

determine a PDSCH among the first PDSCH and the second PDSCH based on a first radio network temporary identifier (RNTI) associated with the first PDSCH and a second RNTI associated with the second PDSCH;

identify whether the first symbol of the PUSCH is within a preparation time from a CORESET associated with the determined PDSCH; and transmit the determined PDSCH or receive the PUSCH based on whether the first symbol of the PUSCH is within the preparation time from the CORESET associated with the determined PDSCH.

20. The base station of claim 16, wherein in case that a user equipment (UE) operates based on half-duplex, the at least one processor is further configured to:

determine either the first PDSCH or the PUSCH based on whether the PUSCH is within a preparation time from the first CORESET;

determine either the second PDSCH or the PUSCH based on whether the PUSCH is within the preparation time from the second CORESET; and based on a determined channel between the first PDSCH and the PUSCH and a determined channel between the second PDSCH and the PUSCH, transmit the first PDSCH or the second PDSCH, or receive the PUSCH.

* * * * *